US008010969B2

(12) United States Patent
Hankins et al.

(10) Patent No.: US 8,010,969 B2
(45) Date of Patent: Aug. 30, 2011

(54) MECHANISM FOR MONITORING INSTRUCTION SET BASED THREAD EXECUTION ON A PLURALITY OF INSTRUCTION SEQUENCERS

(75) Inventors: Richard A. Hankins, San Jose, CA (US); Gautham N. Chinya, Hillsboro, OR (US); Hong Wang, Fremont, CA (US); Shivnandan D. Kaushik, Portland, OR (US); Bryant E. Bigbee, Scottsdale, AZ (US); John P. Shen, San Jose, CA (US); Trung A. Diep, San Jose, CA (US); Xiang Zou, Beaverton, OR (US); Baiju V. Patel, Portland, OR (US); Paul M. Petersen, Champaign, IL (US); Sanjiv M. Shah, Champaign, IL (US); Ryan N. Rakvic, Palo Alto, CA (US); Prashant Sethi, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 1267 days.

(21) Appl. No.: 11/151,809

(22) Filed: Jun. 13, 2005

(65) Prior Publication Data

US 2006/0282839 A1    Dec. 14, 2006

(51) Int. Cl.
  *G06F 3/00* (2006.01)
  *G06F 9/46* (2006.01)
  *G06F 7/38* (2006.01)
(52) U.S. Cl. .................. 719/318; 718/100; 712/235

(58) Field of Classification Search .......... 717/104–107, 717/151–161
See application file for complete search history.

(56) References Cited

U.S. PATENT DOCUMENTS

| 6,157,964 | A * | 12/2000 | Young ............................. 710/5 |
| 6,560,695 | B1 * | 5/2003 | Heaslip .......................... 712/214 |
| 6,728,959 | B1 * | 4/2004 | Merkey .......................... 718/102 |
| 6,792,392 | B1 * | 9/2004 | Knight ........................... 702/186 |
| 2002/0019723 | A1 * | 2/2002 | Zwiegincew et al. ......... 702/186 |
| 2003/0014667 | A1 * | 1/2003 | Kolichtchak ................... 713/201 |
| 2003/0110366 | A1 * | 6/2003 | Wu et al. ....................... 712/225 |
| 2004/0199919 | A1 * | 10/2004 | Tovinkere ...................... 718/102 |
| 2005/0081010 | A1 * | 4/2005 | DeWitt et al. ................. 711/165 |
| 2005/0183065 | A1 * | 8/2005 | Wolczko et al. .............. 717/124 |
| 2005/0223199 | A1 * | 10/2005 | Grochowski et al. ......... 712/235 |
| 2006/0150183 | A1 * | 7/2006 | Chinya et al. ................. 718/100 |
| 2006/0150184 | A1 * | 7/2006 | Hankins et al. ............... 718/100 |
| 2006/0271932 | A1 * | 11/2006 | Chinya et al. ................. 718/100 |

* cited by examiner

*Primary Examiner* — Hyung S Sough
*Assistant Examiner* — Carina Yun
(74) *Attorney, Agent, or Firm* — Blakely, Sokoloff, Taylor & Zafman LLP

(57) ABSTRACT

A technique to monitor software thread performance and update software that issues or uses the thread(s) to reduce performance-inhibiting events. At least one embodiment of the invention uses hardware and/or software timers or counters to monitor various events associated with executing user-level threads and report these events back to a user-level software program, which can use the information to avoid or at least reduce performance-inhibiting events associated with the user-level threads.

32 Claims, 16 Drawing Sheets

Scenario Table

| Scenario ID | Scenario | Description |
|---|---|---|
| 1 | BEGIN_PROXY | |
| 2 | END_PROXY | |
| 3 | INIT | |
| 4 | FORK/EXEC | |
| | | |

FIG. 6A

| Scenario | Yield Event Instruction Pointer |
|---|---|
| BEGIN_PROXY | |
| END_PROXY | |
| INIT | |
| FORK/EXEC | |

FIG. 6B

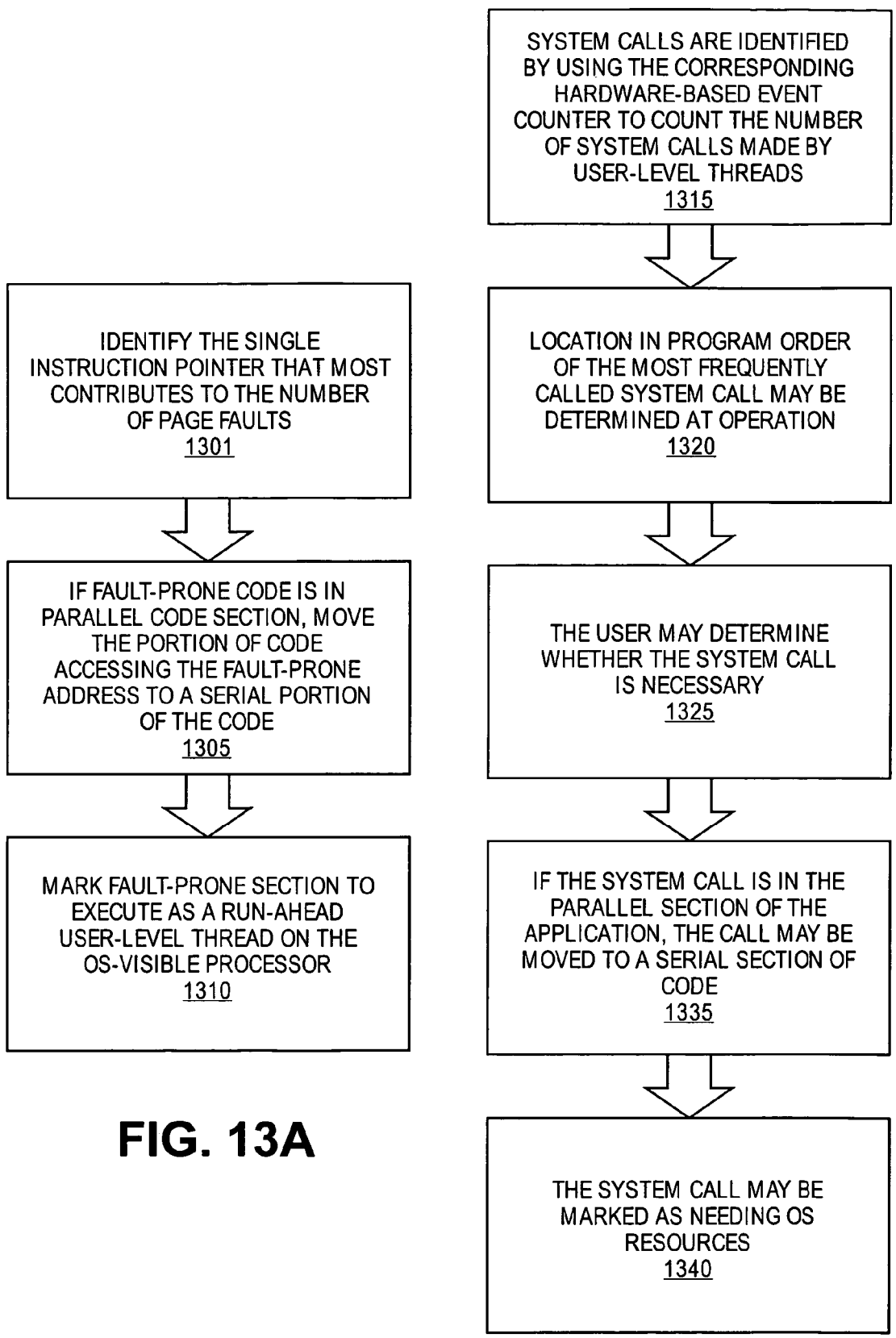

MECHANISM FOR MONITORING INSTRUCTION SET BASED THREAD EXECUTION ON A PLURALITY OF INSTRUCTION SEQUENCERS

FIELD OF THE INVENTION

Embodiments of the invention relate to methods and apparatus for processing instructions.

BACKGROUND

In order to increase performance of information processing systems, such as those that include microprocessors, both hardware and software techniques have been employed. On the hardware side, microprocessor design approaches to improve microprocessor performance have included increased clock speeds, pipelining, branch prediction, superscalar execution, out-of-order execution, and caches. Many such approaches have led to increased transistor count, and have even, in some instances, resulted in transistor count increasing at a rate greater than the rate of improved performance.

Rather than seek to increase performance strictly through additional transistors, other performance enhancements involve software techniques. One software approach that has been employed to improve processor performance is known as "multithreading." In software multithreading, an instruction stream may be divided into multiple instruction streams that can be executed in parallel. Alternatively, multiple independent software streams may be executed in parallel.

In one approach, known as time-slice multithreading or time-multiplex ("TMUX") multithreading, a single processor switches between threads after a fixed period of time. In still another approach, a single processor switches between threads upon occurrence of a trigger event, such as a long latency cache miss. In this latter approach, known as switch-on-event multithreading ("SoEMT"), only one thread, at most, is active at a given time.

Increasingly, multithreading is supported in hardware. For instance, in one approach, processors in a multi-processor system, such as chip multiprocessor ("CMP") systems (multiple processors on single chip package) and symmetric multi-processor ("SMP") systems (multiple processors on multiple chips), may each act on one of the multiple software threads concurrently. In another approach, referred to as simultaneous multithreading ("SMT"), a single physical processor core is made to appear as multiple logical processors to operating systems and user programs. For SMT, multiple software threads can be active and execute simultaneously on a single processor core. That is, each logical processor maintains a complete set of the architecture state, but many other resources of the physical processor, such as caches, execution units, branch predictors, control logic and buses are shared. For SMT, the instructions from multiple software threads thus execute concurrently on each logical processor.

For a system that supports concurrent execution of software threads, such as SMT, SMP, and/or CMP systems, an operating system may control scheduling and execution of the software threads. Alternatively, it is possible that some applications may directly schedule multiple threads for execution within a processing system. Such application-scheduled threads are generally invisible to the OS and are known as "user-level threads".

User-level threads can be scheduled for execution by an application running on a processing resource that is managed by an OS. Alternatively, in a processing system with multiple processing resources, user-level threads may be scheduled to run on a processing resource that is not directly managed by the OS, but rather managed by a user-controllable software application in a manner such that OS resources are not effected by the user-level threads. User-level threads not directly managed by the OS may be referred to as "OS invisible" threads or "shreds", whereas threads managed directly by the OS may be referred to as "OS visible" threads. Typically shreds run within an OS-visible thread, that is to say the shreds typically belong to a subset of threads within an OS-visible thread that use a subset of thread state context of the OS-visible thread.

Unfortunately, user-level threads can cause the OS to be interrupted under various circumstances, such as when the user-level threads encounter a page fault, exception, interrupt, system call, etc. Furthermore, processing of the user-level threads may be hindered by one or more user-level threads waiting on one or more user-level or OS-visible threads for access to processing resources, such as during a thread synchronization operation, such as a block or spin lock cycle.

OS interruptions by a user-level thread can be communicated in the form of proxy execution, in which the user-level threads interrupt the OS via the interface between the OS and the OS-visible thread to which the user-level thread(s) correspond. In proxy execution, the OS is not "aware" that the interruption is coming from the user-level thread, because the OS-visible thread interrupts the OS on behalf of the user-level thread(s).

Proxy execution and thread delay due to locking, for example, can cause degradation in computer system performance, especially as the number of OS-visible threads and user-level threads increase. Proxy execution, in particular, can detract the OS from performing other tasks thereby degrading computer system performance. Currently, there is no technique for user-level code to obtain information that could help the user-level code avoid or at least reduce the number of OS interruptions caused by proxy execution or thread locking.

BRIEF DESCRIPTION OF THE DRAWINGS

FIGS. 6A-6B illustrate tables, in accordance with one embodiment of the invention, that may be used to program a service channel;

FIGS. 13A-C are flow diagrams illustrating various models for updating user-level software in response to ascertaining various performance information pertaining to a user-level thread, according to one embodiment.

DETAILED DESCRIPTION

Figure 1A:
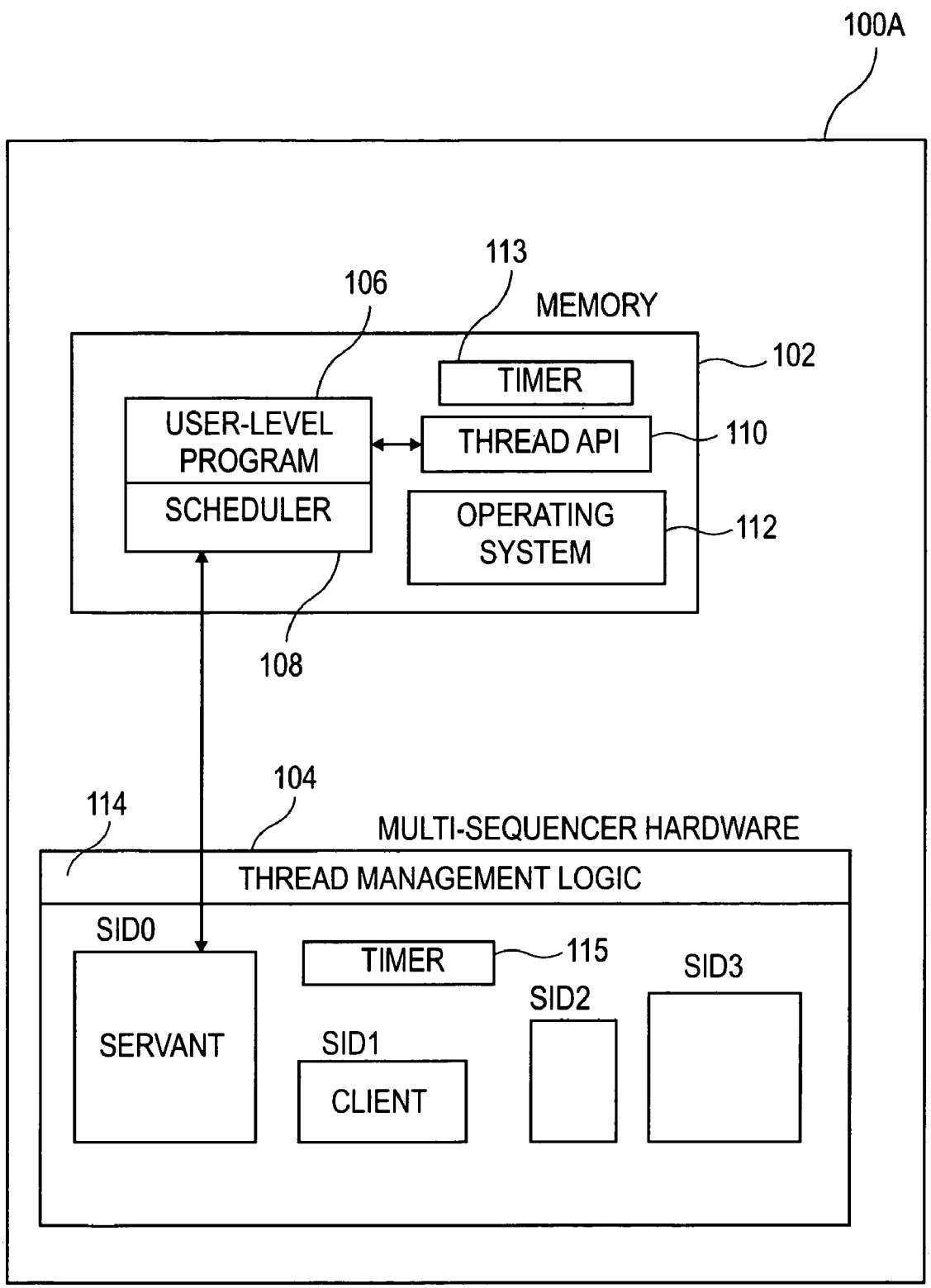
FIGS. 1A and 1B show high-level block diagrams of a multi-sequencer system, in accordance with one embodiment of the invention.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in this specification to "one embodiment" or "an embodiment" means that a particular feature, structure, or characteristic described in connection with the embodiment is included in at least one embodiment of the invention. The appearance of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The following description describes embodiments of an architectural mechanism to create and control threads of execution on sequencers of a multiple sequencer system that are sequestered away from OS control.

As used herein, the term "instruction sequencer" or simply "sequencer" includes next instruction pointer logic and at least some processor state. For example, an instruction sequencer may comprise a logical processor, or a physical processor core.

Embodiments of the invention may be used in conjunction with user-level software, such as a software application program, to intelligently schedule user-level threads created within OS-visible threads by reducing the number of performance-degrading events, such as proxy execution and thread synchronization (e.g., via thread locking). Furthermore, embodiments of the invention enable user-level software to intelligently schedule user-level threads to avoid thread dependencies, which may result in thread execution delay and system performance degradation.

In an embodiment, the architectural mechanism may comprise just two instructions that together define a signaling mechanism to send and receive a signal between any two sequencers without using an OS API. The signal may comprise an architecturally defined event or scenario, which is mapped to handler-code. Upon receipt of the signal at a sequencer, the scenario in the signal acts as a trigger to cause the sequencer to vector to the handler-code. Using the two instructions, it is possible to implement thread creation, thread control, and thread synchronization software primitives provided by existing thread libraries.

Further, the two instructions may be used to create a proxy execution mechanism to cause a servant sequencer to execute code on behalf of a client sequencer, as will be explained in greater detail below.

In embodiments of the invention, events or scenarios that take place during the creation, control, or synchronization of user-level or OS-visible threads, including proxy execution, can be monitored and used by an application software program to intelligently create, control, or synchronize threads in a manner so as to reduce various sources of software program and/or computer system performance degradation. In one embodiment of the invention, thread-related events and scenarios are monitored using various timers, either in hardware, software, or both, which can be used by application software to reduce performance reducing events and scenarios, such as proxy execution and thread lock mechanisms.

Accordingly, example processor systems are described that include two or more instruction sequencers to execute different threads. At least some of the two or more instruction sequencers include sequencer-aware user-level instructions in their instruction sets that allow for inter sequencer control by a thread management operation on a specified instruction sequencer without intervention from an operating system. The sequencer-aware user-level instructions may include an instruction sequencer control transfer instruction, an instruction sequencer monitoring instruction, a context save instruction, and a context restore instruction. The processor system may also have thread management logic to respond to a user-level instruction to allow a non-sequestered instruction sequencer to create parallel threads of execution on the associated sequestered instruction sequencers without an operating system scheduler. Also, the processor system may have a proxy execution mechanism to allow a client instruction sequencer to trigger a proxy thread to execute on the servant instruction sequencer on behalf of the client instruction sequencer in response to certain triggering conditions encountered during instruction execution on the client sequencer and without intervention of the operating system.

Example processor systems may also have an event or scenario monitoring mechanism to allow an application software program to intelligently schedule, create, control, or synchronize user-level threads so as to reduce performance degrading events or scenarios, such as proxy execution and thread locking events. In one embodiment, the event or scenario monitoring system may include a number of timers in hardware and/or software, which can be used separately or combined according to some logical function to monitor a number of events and scenarios and provide data to an application software program about those events and scenarios.

Turning now to FIG. 1A of the drawings, reference numeral 100A indicates a multi-sequencer system, in accordance to one embodiment of the invention. The multi-sequencer system 100A includes a memory 102 and multi-sequencer hardware 104. The memory 102 comprises a user-level program 106, which includes a scheduler 108 to schedule instructions for execution on the multi-sequencer hardware 104. To express multiple threads of execution, the user-level program 106 makes use of a thread Application Program Interface (API) 110 to a thread library that provides thread creation, control, and synchronization primitives to the user-level program 106. Also located within the memory 102 is an operating system 112. The multi-sequencer hardware 104 includes a plurality of sequencers, only four of which have been shown in FIG. 1A. The four shown sequencers are designated SID0, SID1, SID2, and SID3, respectively.

As used herein, a "sequencer", may be a distinct thread execution resource and may be any physical or logical unit capable of executing a thread. An instruction sequencer may include a next instruction pointer logic to determine the next instruction to be executed for the given thread. A sequencer may be a logical thread unit or a physical thread unit. In an embodiment, multiple instruction sequencers may be within a same processor core. In an embodiment, each instruction sequencers may be within a different processor core.

Included in a given processor core, is an instruction set architecture. The instruction set architecture (ISA) may be an abstract model of the processor core that consists of state elements (registers) and instructions that operate on those state elements. The instruction set architecture serves as a boundary between software and hardware by providing an abstract specification of the processor core's behavior to both the programmer and the microprocessor designer. The instruction set may define the set of instructions that the processor core is capable of decoding and executing.

While the Chip Multiprocessing (CMP) embodiments of the multi-sequencer hardware 104 discussed herein refers to only a single thread per sequencer SID0-SID3, it should not be assumed that the disclosures herein are limited to single-threaded processors. The techniques discussed herein may be employed in any Chip Multiprocessing (CMP) or Simultaneous Multithreading Processor (SMT) system, including in a hybrid system with CMP processors and SMT processors where each core of a CMP processor is a SMT processor or a Switch-On-Event Multiprocessor (SoeMT). For example, the techniques disclosed herein may be used in system that includes multiple multi-threaded processor cores in a single chip package 104.

The sequencers SID0-SID3 are not necessarily uniform and may be asymmetrical respect to any factor that affects computation quality such as processing speed, processing capability, and power consumption. For example, the sequencer SID0 may be "heavy weight" in that it is designed to process all instructions of a given instruction set architecture (e.g. IA32 the Instruction Set Architecture). Whereas, the sequencer SID1 may be "light weight" in that it can only process a selected subset of those instructions. In another embodiment, a heavyweight processor may be one that processes instructions at a faster rate than a lightweight processor. The sequencer SID0 is Operating System (OS)-visible, whereas the sequencers SID1 to SID3 are OS sequestered. However, this does not mean that every heavyweight sequencer is OS-visible or that all lightweight sequencers are sequestered. As used herein, the term "OS sequestered" denotes a sequencer that has transitioned to a sequestered state or condition. A characteristic of such a sequestered state or condition is that the OS does not schedule instructions for a sequencer in such a state.

Figure 2:
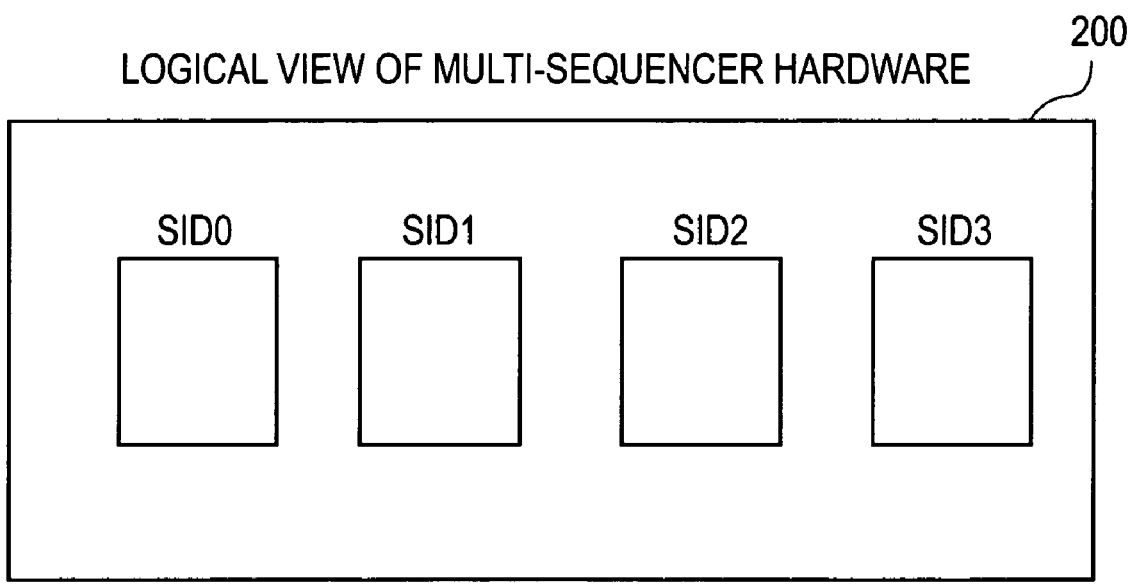
FIG. 2 shows a logical view of multi-sequencer hardware forming a part of the multi-sequencer system of FIGS. 1A and 1B.

As will be seen, the multi-sequencer hardware or firmware (e.g. microcode) also includes thread management logic 114. In an embodiment, the thread management logic 114 virtualizes the sequencers SID0-SID3 so that they appear to the user-level program 106, as uniform. In other words, the thread management logic 114 masks the asymmetry of the sequencers SID0-SID3 so that from a logical point of view as seen by an assembly language programmer, the sequencers SID0-SID3 appear uniform, as is depicted in the view 200 shown in FIG. 2 of the drawings.

In the system 100A, shown in FIG. 1A of the drawings, the user-level program 106 is tightly coupled to the multi-sequencer hardware 104. In an embodiment, the user-level program 106 may be loosely coupled to the multi-sequencer hardware 104 through intermediate drivers. Such a system is depicted by reference numeral 100B, in FIG. 1B of the drawings. The system 100B is basically the same as the system 100A, except that instead of using scheduler 108, the user-level program makes use of a kernel level software such as a device driver 116, such as a driver, a hardware abstraction layer, etc, to communicate with kernel level API 118 in order to schedule instructions for execution on the multi-sequencer hardware 104.

Figure 1B:
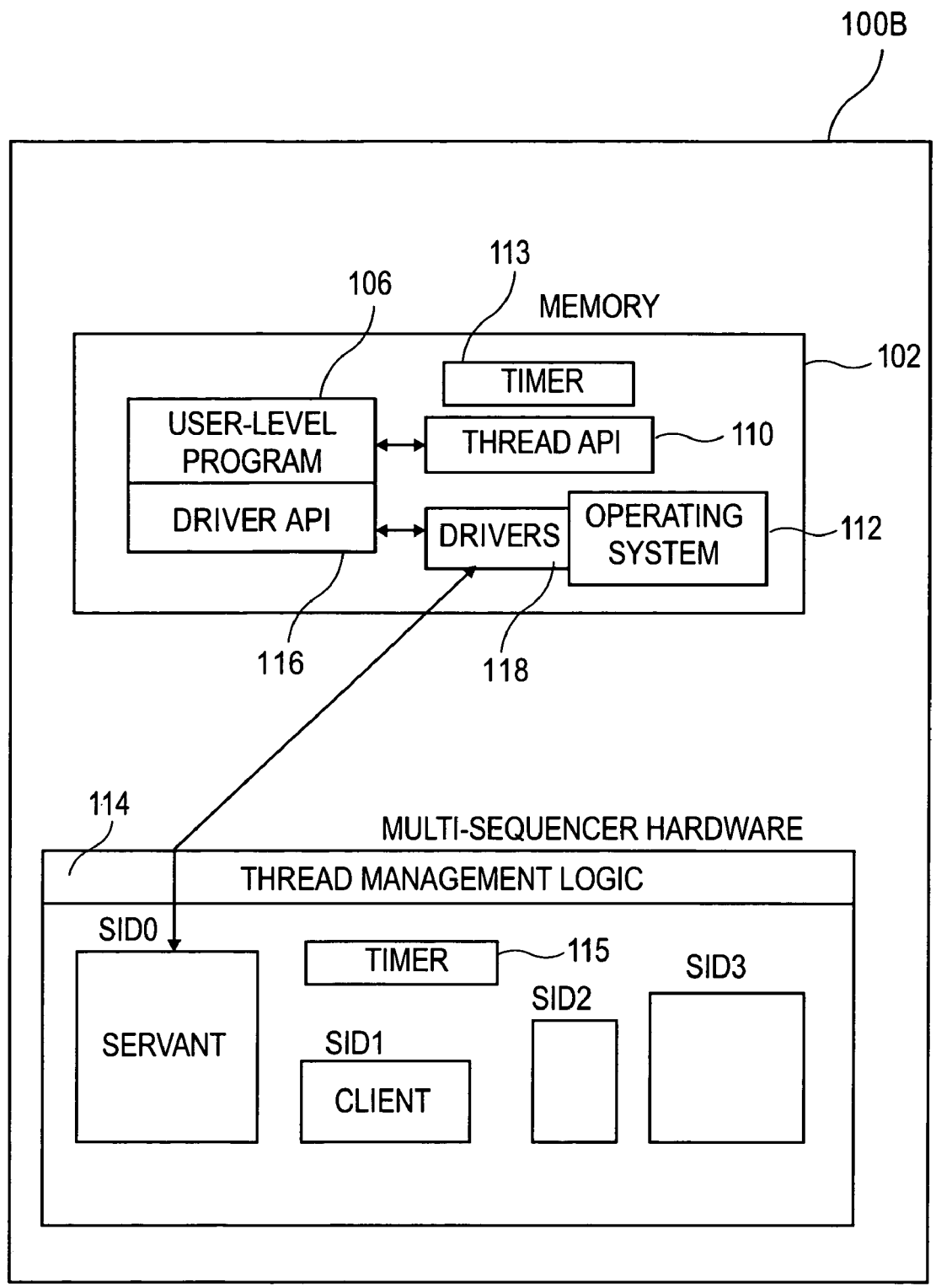
Figure 3A:
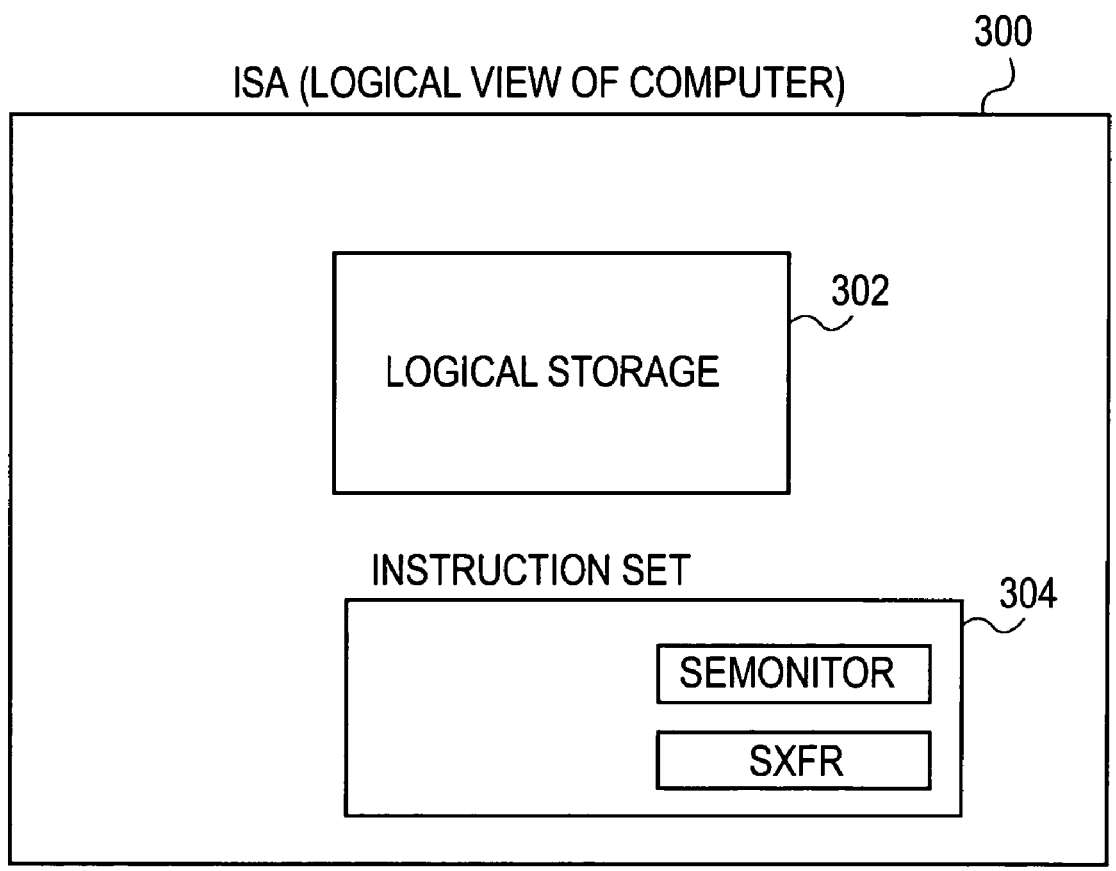
FIG. 3A shows a view of an instruction set architecture for the systems of FIGS. 1A and 1B.

FIG. 3A shows a view of an instruction set architecture for the systems of FIGS. 1A-1C. Referring now to FIG. 3A of the drawings, there is shown an Instruction Set Architecture (ISA) view 300 of the systems 100A, and 100B. An ISA defines a logical view of a system, as seen by an assembly language programmer, binary translator, assembler, or the like. In terms of its ISA, the systems 100A, and 100B include a logical storage 302 and an instruction set 304. The logical storage 302 defines a visible memory hierarchy, addressing scheme, register set, etc. for the systems 100A, and 100B, whereas the instruction set 304 defines the instructions and the format of the instructions that the systems 100A, and 100B support. In an embodiment, the instruction set 304 may comprise the instruction set known as the IA32 instruction set and its extensions, although other instruction sets are possible. Additionally, in an embodiment, the instruction set 304 includes two instructions known as a user-level control-transfer instruction, and a user-level monitoring instruction. An example of a user-level control-transfer instruction may be a SXFR instruction. An example of a user-level monitoring instruction may be a SEMONITOR instruction. An example SXFR instruction and SEMONITOR instruction will be discussed to assist in understanding of a user-level control-transfer instruction and a user-level monitoring instruction.

Broadly, the SXFR instruction is used to send a signal from a first sequencer to a second sequencer, and the SEMONITOR instruction is used to configure the second sequencer to monitor for the signal from the first sequencer. Further, these control transfer and monitoring instructions are sequencer aware, as will be discussed later, and can compose more sequencer aware composite instructions.

Figure 3B:
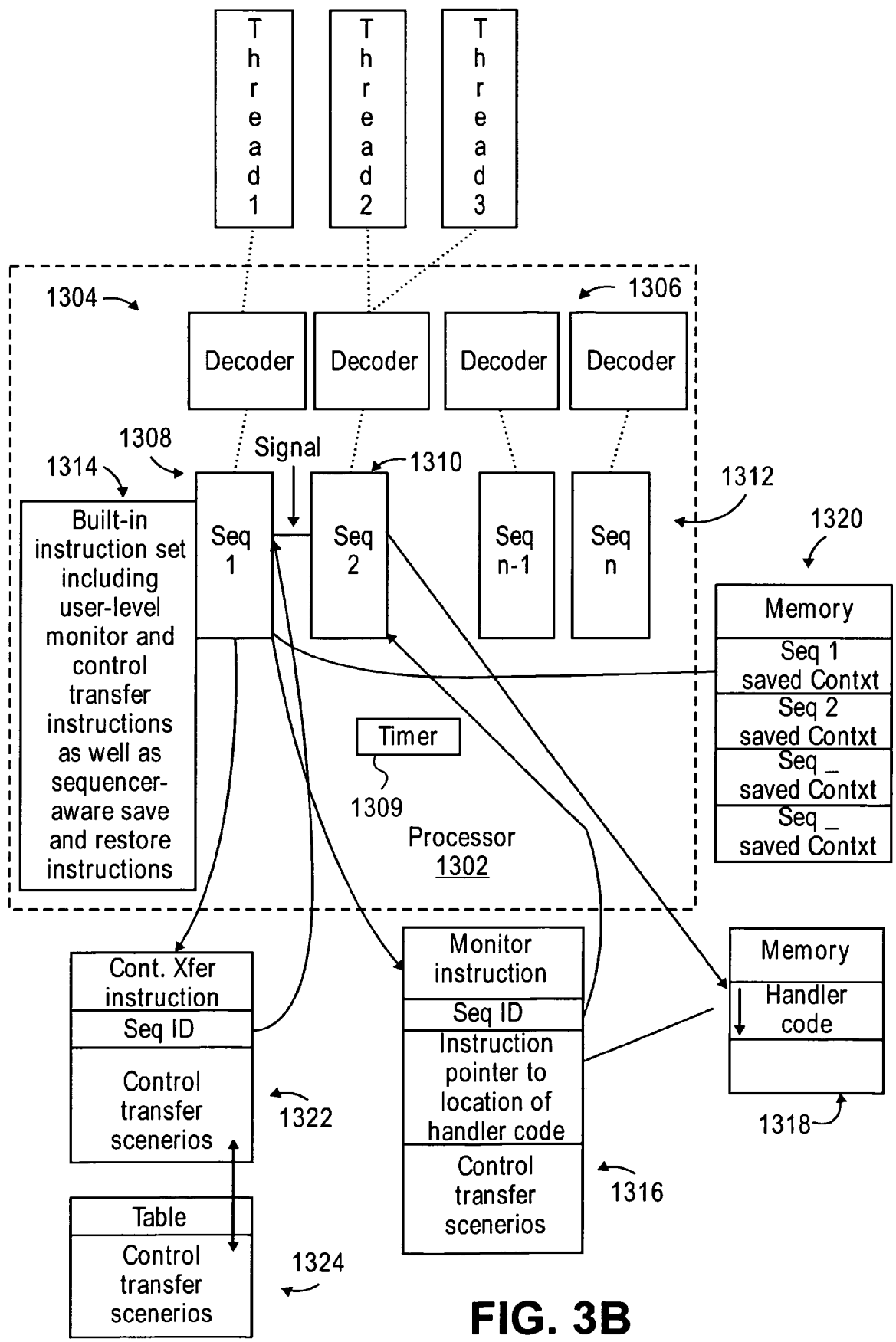
FIG. 3B illustrates a logical diagram of an embodiment of a processor with two or more instruction sequencers that include a user-level control-transfer instruction and a user-level monitor instruction in their instruction sets.

FIG. 3b illustrates a logical diagram of an embodiment of a processor with two or more instruction sequencers that include a user-level control-transfer instruction and a user-level monitor instruction in their instruction sets. The processor 332 may include one or more instruction sequencers 338-342 to execute different threads. In an embodiment, multiple instruction sequencers can share a decoder unit and/or instruction execution unit. Likewise, each instruction sequencer can have its own dedicated process instruction pipeline that includes a decoder unit, such as a first decoder unit 334, an instruction execution unit such as a first instruction execution unit 335, etc. At least some of the multiple instruction sequencers 338-342 include instruction sets 344 that at least include a user-level monitoring instruction (such as a SEMONITOR instruction), a user-level control-transfer instruction (such as a SXFR instruction), a sequencer-aware store instruction (such as a SSAVE instruction), and a sequencer-aware restore instruction (such as a SRSTOR instruction). Alternatively, the sequencer-aware store and restore instructions may not be part of the instruction set 344. Rather, the user-level control-transfer and monitoring instructions may be part of the instruction set and then used in conjunction with a scenario and a pointer to handler code to compose the sequencer-aware store and restore instructions. Types of scenarios, which may be architecturally defined composite triggering conditions based on micro architectural events, will be described later.

The flow of the control transfer operation may occur as follows.

A first instance of the user-level monitoring instruction 346 may specify one of the instructions sequencers, a pointer to a location of handler code, and one of a number of control-transfer scenarios. The monitoring instruction 346 may cause the executing instruction sequencer, such as a first instruction sequencer 338, to setup the specified instruction sequencer to invoke the handler-code at the specified memory location upon observing or receiving signaling of the specified control-transfer scenario. The first memory location 348 storing the handler code may be a register, a cache, or other similar storage device. The user-level monitoring instruction 346 may be executed first to set up a specified target instruction sequencer to receive a control-transfer signal before the source instruction sequencer sends this control-transfer signal.

The executing instruction sequencer, such as the first instruction sequencer 338, may execute a sequencer-aware save instruction in order to save the context state of target instruction sequencer. The context state of the destination instruction sequencer may be stored in a second memory location 350. The second memory location may be a different location within a shared memory array or in a discrete memory area than the first memory location.

A first instance of the control-transfer instruction 352 may specify one of the instruction sequencers and one of the many control-transfer scenarios. The specified control-transfer scenario may be stored in, for example, a table 354. The control-transfer instruction 352 causes the executing instruction sequencer to generate a control-transfer signal to be received by the specified target instruction sequencer, such as a second instruction sequencer 340.

The specified target instruction sequencer 340 detects the control-transfer signal generated in response to the execution of the control-transfer instruction 352 that specifies that instruction sequencer. The specified target instruction sequencer 340 then executes the handler code specified by the monitoring instruction 346 that specified that instruction sequencer.

After the execution of the handler code has finished, the first instruction sequencer 338 (i.e. the source instruction sequencer) may execute a sequencer-aware restore instruction to restore the context state of target instruction sequencer from its location in the second memory location 350.

In an embodiment, a processor may include multisequencer hardware. Each instruction sequencer is capable of executing different threads. At least some of the multiple instruction sequencers are capable of executing user-level instructions. The user-level instructions may be sequencer-aware. Each of the user-level instructions may contain information that specifies at least one of the multiple instructions sequencers. Execution of the instructions on an executing sequencer causes the executing instruction sequencer to perform a thread management operation on the specified one of the multiple instruction sequencers without operating system intervention. The thread management operation may be a thread creation, a thread control, or a thread synchronization operation. Examples of the user-level instructions include the sequencer-aware SXFR, SEMONITOR, SSAVE, and SRSTR instructions described in more detail below.

Specifically, the counter circuit illustrated in FIG. 3b may include one or more counters that may be used to count events within the processor, such as a number of transitions from ring 0 to ring 3 privilege level resources, including those transitions due to proxy execution. Conversely, the counter(s) of FIG. 3 may count the number of transitions from ring 3 to ring 0. Moreover, the counter(s) may count the number of ring transitions due to exceptions and/or interrupts that occur within the processor. In other embodiments, instead of counting ring transitions, the counter(s) may count the number of context switches that occur within the processor due to thread transitions. In one embodiment, the counter(s) may count the number of page faults caused by the user-level threads and/or the number of system calls that occur within the processor. In addition to counting various events, at least one embodiment includes at least one notification circuit to notify user-level software of the occurrence of a page fault and/or a system call. In one embodiment, a notification of a page fault or system call to user-level software is performed by providing the instruction pointer of the instruction causing the page fault or system call, respectively, to the user-level software.

Numerous types of counter circuits may be used to perform the counting operations described above. In one embodiment one or more of the above counting operations are performed using one counter circuit, whereas in other embodiments, a number of counter circuits are used to count one or more of the above counting operations.

In addition to or in lieu of hardware counters, counters may be implemented in one embodiment using software to count events related to user-level thread synchronization, such as locking conditions. For example, in one embodiment of the invention, user-level software may include event counters, such as a "critical count" counter to count the number of calls to lock a critical section of code (via spin lock, for example), a "critical miss" counter to count the number of times a call to lock a critical section of code is blocked, a "mutex count" counter to count the number of calls to lock a mutex (via block lock, for example), a "mutex miss" counter to count the number of times a call to lock a mutex is blocked, a "condition count" counter to count the number of calls to lock a condition variable (from a block lock, for example), a "condition miss" counter to count the number of times a call to lock a condition variable is blocked, a "semaphore counter" to count the number of calls to lock a semaphore (via block locking, for example), a "semaphore miss" counter to count the number of times a call to lock a semaphore is blocked.

The above software-based counters may be implemented as one or more counters within software. Furthermore, the outputs of two or more of the software-based counters may be used to derive other useful information for a user-level program by performing logical operations on the outputs of the counters, for example. At least one embodiment includes software-based counters to count the total amount of time a user-level thread is executing a task ("run time" counter) and a counter to count the amount of time a user-level thread is not executing a task ("idle time" counter).

The software and/or hardware-based counters described above can monitor page faults and system calls on a per-instruction pointer basis through the user-level interrupt mechanism provided by the hardware. Upon every event-interrupt generated by the hardware, the software-based counters in conjunction with software routines that use them can record both the event and the instruction pointer that caused it. With these statistics, user-level software can generate a profile of the number and cause of proxy execution. Using this profile, this disclosure explains, below, how the user can improve the performance of a application software.

Three factors that can influence user-level software performance include, the number of proxy executions that occur, the number of calls made to synchronization primitives (for thread locking, for example), and application-specific user-level thread scheduling. The following are a few examples of how a user may take advantage of run-time statistics provided by the above-mentioned hardware and software counters.

In one embodiment, the user may execute the application using a profiling version of user-level software with one or more of the hardware/software counters enabled. A statistics report may then be generated from the counter values. Proxy execution can result from a page fault condition. Because proxy execution is particularly common and time consuming in executing user-level software programs, reducing the number of page faults resulting from running a user-level program can improve performance of the user-level program.

FIG. 13A is a flow diagram illustrating operations that may be used by a user to decrease the number of page faults in a user-level program. In one embodiment, the number of page faults can be reduced by first identifying the single instruction pointer that most contributes to the number of page faults at operation 1301. This can be accomplished by sorting the page faults and their corresponding instruction pointer values that are generated by the hardware-based event counters and are recorded by a run-time environment. Alternatively, a user could plot the page address that incurred a fault and the corresponding instruction pointer that generated the page request that lead to the fault. Such a chart may identify sections of code that commonly generate page faults.

A user may also plot page faults and their corresponding instruction pointers over time. A pattern generated by such a chart may indicate a reason for the fault. For example, if the pattern of page faults is repeating over time, moving memory allocation/de-allocation outside of the loop in which the page faults occur and reusing the memory may reduce the number of faults. If the pattern reflects a linear increase or decrease in the faulting page addresses, but does not repeat, this pattern may indicate the problem lies in the initialization process of the memory.

A user may also reduce page faults by moving the portion of code accessing the fault-prone address to a serial portion of the code at operation 1305, such as heap-memory initialization code. If memory initialization happens inside of parallelized code, it may be more efficient to move the initialization to a serial section of code in some embodiments. Placing the initialization code within a serial section of code, the initialization code may schedule code to execute on an OS-visible processor. The section of code incurring the page fault may be identified as requiring OS-visible resources by using calls into the user-visible threaded software. This may allow run-time schedulers to schedule those sections on an OS-visible processor. If the page faults are identified as instruction pages (vis-a-vis the instruction pointers being equal to the faulting page address), the section of code can be marked to execute as a run-ahead user-level thread on the OS-visible processor at operation 1310. Run-ahead threads may catch page faults before the other threads arrive at those sections of code.

The above process can be repeated for other instruction pointers corresponding to page faults.

System calls can be optimized in a similar manner as page faults. For example, FIG. 13B is a flow diagram illustrating a technique for reducing system calls in user-level software according to one embodiment. At operation 1315, the system calls are identified by using the corresponding hardware-based event counter to count the number of system calls made by user-level threads. The location in program order of the most frequently called system call may be determined at operation 1320 by noticing the number of counts (corresponding to the system calls) per instruction pointer. Next, the user may determine whether the system call is necessary at operation 1325. If the system call is necessary, the user may determine whether it can be moved outside of the loop in which it currently resides. If the system call is in the parallel section of the application, the call may be moved to a serial section of code at operation 1335. The system call may be marked as needing OS resources operation 1340, which will allow the user-level thread scheduler to serialize only that portion of the code. The above process illustrated in FIG. 13B may repeated for each of the most frequently occurring instruction pointers.

Figure 13C:
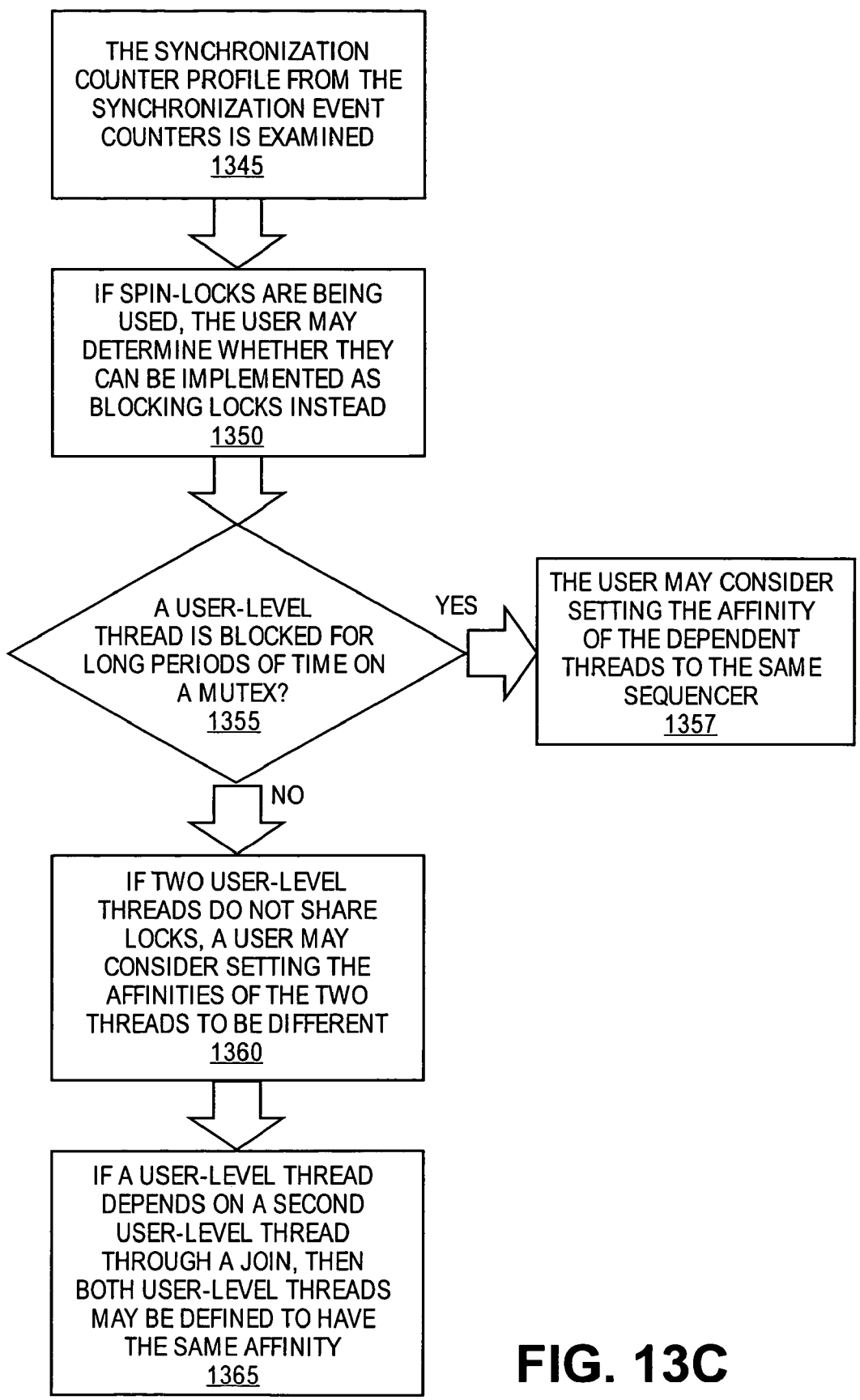

The event counters counting user-level thread synchronization primitives can also be used to improve user-level software performance. For example, FIG. 13C is a flow diagram illustrating operations that may be employed to use synchronization event counters to improve software performance.

At operation 1345, the synchronization counter profile from the synchronization event counters is examined. If spin-locks are being used, the user may determine whether they can be implemented as blocking locks instead at operation 1350. User-level blocking locks may be more efficient than their OS-level counterparts in some embodiments. Spin locks may be best used over very small sections of code, in some embodiments. At operation 1355, a user may determine whether a user-level thread is blocked for long periods of time on a mutex. If so, the user may consider setting the affinity of the dependent threads to the same sequencer at operation 1357. If two user-level threads do not share locks, a user may consider setting the affinities of the two threads to be different at operation 1360, whereas if a user-level thread depends on a second user-level thread through a join, then both user-level threads may be defined to have the same affinity at operation 1365.

Other scenarios and techniques may take advantage of hardware and/or software-based event counters described above to improve the performance of user-level software applications in other embodiments. For example, opportunities exist to improve performance, either at compile time through static profiling, or at run-time through dynamic profiling. In either case, performance event counters described above may help to automate the performance profiling process.

In at least one embodiment, because the instructions that generate proxy execution requests can be identified automatically, thread scheduling on an OS-visible sequencer can be performed automatically by noting either the thread or the section of code requiring proxy execution, and then augmenting the compile information or even the binary file generated from the compiler.

User-level threads can also be optimized dynamically. For example, in one embodiment, if a scheduler determines that a user-level thread is incurring a large number of proxy executions, that user-level thread can be transferred to an OS-visible core. Similarly, in one embodiment, if a particular user-level thread spends a lot of time blocked on a synchronization primitive, the scheduler can change the affinity of the user-level thread, such that it runs on the same sequencer as its dependent user-level thread.

In one embodiment, a dependency graph can be generated based on information recorded in the synchronization event records. This dependency graph can aid the user in breaking thread dependencies, or possibly managing the dependencies in a smarter way. For example, through an analysis of a dependency graph, the user may determine that some threads should be scheduled in parallel, while other may be sequential. Furthermore, a user can identify a preferred sequencer for a task through a specification for sequencer affinity. Setting the affinity of two different threads for two different sequencers may increase the likelihood that the two will be executed in parallel in some embodiments. Setting the affinity for both threads to the same processor may increase the likelihood that the threads will execute sequentially, in some embodiments. Also, if the threads share locks and other data, it may be beneficial for them to execute on the same sequencer to reduce coherence costs, in some embodiments.

Dependency analysis may be automated in some embodiments. Based on the dependency graph that is generated from a particular processing workload, the user-level thread scheduler can set the affinity of two threads in the absence of direct control by the user, in one embodiment. For example, if two threads share the same locks, they may be assigned to execute on the same sequencer. As a another example, the scheduler can take advantage of explicit dependencies between two user-level threads (e.g., through a "join call" instruction according to one instruction set architecture). In this second example, because the calling user-level thread will block until the second exits, the scheduler can set the affinities of both user-level threads to run on the same sequencer in one embodiment.

In yet another example, the event counters previously described can be used to determine resource utilization. Based on an amount of idle time experienced in a user-level thread scheduler, the user may decide to create more or less thread parallelism. If the user does not create enough user-level threads for the given amount of OS services, then some sequencers may remain idle. If too many user-level threads are created, however, it is possible that synchronization costs may dominate the performance of the program to which the threads correspond. Through feedback from the user-level program, the user can monitor the utilization of the sequencers, and can increase or decrease the amount of parallelization as necessary in one embodiment.

At least some of the multiple instruction sequencers 1308-1312 include instruction sets 1314 that at least include a user-level monitoring instruction (such as a SEMONITOR instruction), a user-level control-transfer instruction (such as a SXFR instruction), a sequencer-aware store instruction (such as a SSAVE instruction), and a sequencer-aware restore instruction (such as a SRSTOR instruction). Alternatively, the sequencer-aware store and restore instructions may not be part of the instruction set 1314. Rather, the user-level control-transfer and monitoring instructions may be part of the instruction set and then used in conjunction with a scenario and a pointer to handler code to compose the sequencer-aware store and restore instructions.

The flow of the control transfer operation may occur as follows.

A first instance of the user-level monitoring instruction 1316 may specify one of the instructions sequencers, a pointer to a location of handler code, and one of a number of control-transfer scenarios. The monitoring instruction 1316 may cause the executing instruction sequencer, such as a first instruction sequencer 1308, to setup the specified instruction sequencer to invoke the handler-code at the specified memory location upon signaling of the specified control-transfer scenario. The first memory 1318 storing the handler code may be a stack, a register, a cache, or other similar storage device. The user-level monitoring instruction 1316 may be executed first to set up a specified target instruction sequencer to receive a control-transfer signal before the source instruction sequencer sends this control-transfer signal.

The executing instruction sequencer, such as the first instruction sequencer 1308, may execute a sequencer-aware save instruction in order to save the context state of that instruction sequencer. The context state of the executing instruction sequencer may be stored in a second memory 1320.

A first instance of the control-transfer instruction 1322 may specify one of the instruction sequencers and one of the many control-transfer scenarios. The specified control-transfer scenario may be stored in, for example, a table 1324. The control-transfer instruction 1322 causes the executing instruction sequencer to generate a control-transfer signal to be received by the specified target instruction sequencer, such as a second instruction sequencer 1310.

The specified target instruction sequencer 1310 detects the control-transfer signal generated in response to the execution of the control-transfer instruction 1322 that specifies that instruction sequencer. The specified target instruction sequencer 1310 then executes the handler code specified by the monitoring instruction 1316 that specified that instruction sequencer.

After the execution of the handler code has finished, the first instruction sequencer 1308 (i.e. the source instruction sequencer) may execute a sequencer-aware restore instruction to restore the context state of that instruction sequencer from its location in the second memory 1320.

In one embodiment, a processor may include multisequencer hardware. Each instruction sequencer is capable of executing different threads. At least some of the multiple instruction sequencers are capable of executing user-level instructions. The user-level instructions may be sequencer-aware. Each of the user-level instructions may contain information that specifies one of the multiple instructions sequencers. Execution of the instructions on an executing sequencer causes the executing instruction sequencer to perform a thread management operation on the specified one of the multiple instruction sequencers without operating system intervention. The thread management operation may be a thread creation, a thread control, or a thread synchronization operation. Examples of the user-level instructions include the sequencer-aware SXFR, SEMONITOR, SSAVE, and SRSTR instructions described in more detail below.

Figure 4A:
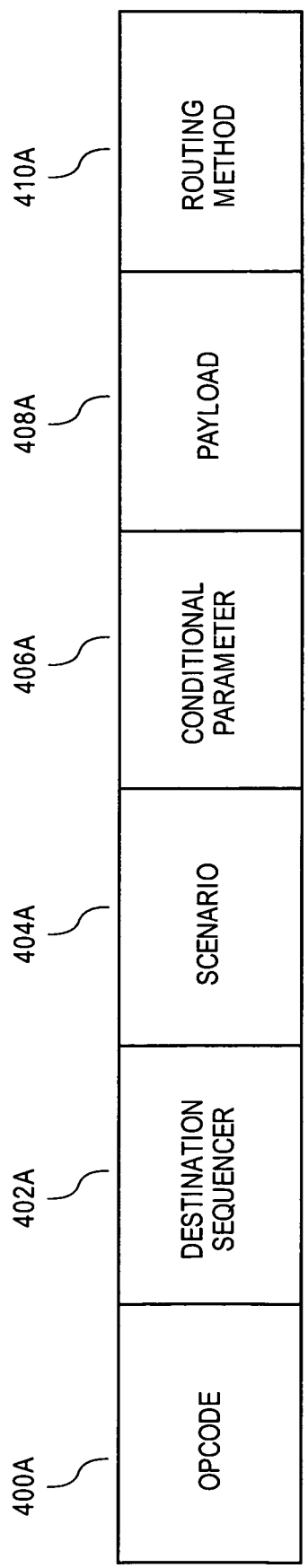
FIGS. 4A and 4B shows the format of the SXFR and SEMONITOR instructions, respectively, in accordance to one embodiment of the invention.

Referring again to FIG. 4A of the drawings, in an embodiment, the operand 406A comprises a conditional parameter that conditions execution of instructions on a sequencer that executes a SXFR instruction. Examples of conditional parameters include a "WAIT" and a "NOWAIT" parameter. For example, when SXFR is used with the PROXY scenario, the WAIT conditional parameter causes the execution of instructions on a sequencer that executes a SXFR instruction to stop while waiting for completion of proxy execution on another sequencer. The NOWAIT conditional parameter specifies that execution on a sequencer that executes a SXFR instruction may continue in parallel with proxy execution on another instruction sequencer.

In an embodiment, the operand 408A comprises a scenario specific payload or data message. For example in the case of the FORK/EXEC scenario, the payload may comprise an instruction pointer at which execution on the sequencer identified by the operand 402A is to commence. According to different embodiments, the payload may comprise an instruction pointer, a stack pointer, etc. Addresses contained in the payload may be expressed in a variety of addressing modes such as literal, register indirect, and base/offset addressing.

The operand 410A specifies a routing function on the SID contained in the operand 402A. The routing function controls whether the signal generated as a result of executing a SXFR instruction is sent as a broadcast, a unicast, or a multicast signal. The routing function can also encode topology-specific hint information that can be used to assist an underlying inter-sequencer interconnect in routing to deliver the signal.

Figure 4B:
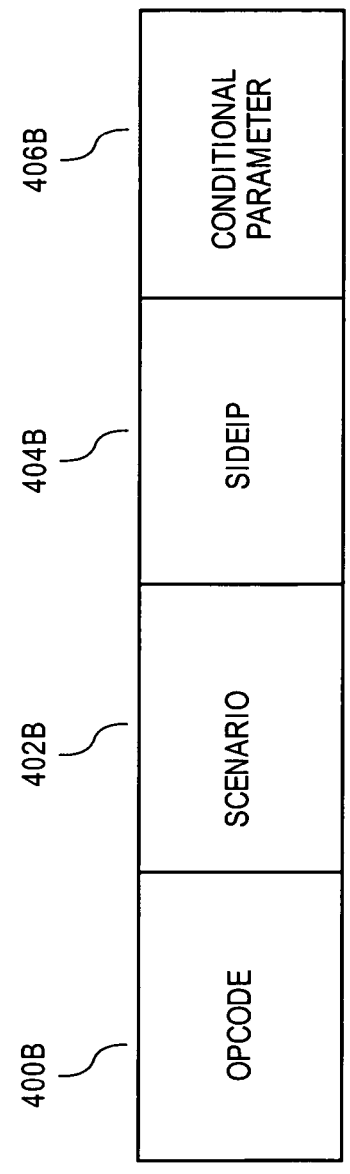

Referring now to FIG. 4B of the drawings, there is shown the format of a SEMONITOR instruction, in accordance with one embodiment of the invention. As can be seen, the SEMONITOR instruction includes an opcode 400B, and operands 402B to 406B. The operand 402B specifies a scenario, which may, for example, be expressed in terms of a scenario ID. The operand 404B specifies a tuple comprising a sequencer ID (SID) and an instruction pointer (EIP). For descriptive convenience, the tuple is referred to as a "SIDEIP".

The SEMONITOR instruction maps a scenario specified in the operand 402B to a SIDEIP specified in the operand 404B. Thus, the SEMONITOR instruction may be used to create a mapping table, such as is shown in FIG. 6B of the drawings, which maps each scenario to a specific SIDEIP. Each mapping of a scenario to a specific SIDEIP is termed a "service channel". The operand 406B allows a programmer to input one or more control parameters to control how a particular service channel is serviced, as will be explained in greater detail below. A programmer may use the SEMONITOR instruction to program the service channels that a particular sequencer uses to monitor for a given scenario. In an embodiment, when the anticipated condition corresponding to a scenario is observed, a sequencer incurs a yield event to cause asynchronous control transfer to a yield event handler starting at the SIDEIP mapped to the scenario. For example, in the case of the anticipated condition corresponding to a fault, once a control yield event is incurred, the current (return) instruction pointer is pushed onto the current stack and control is transferred to the SIDEIP mapped to the observed scenario. In the case of the anticipated condition corresponding to trap, then the next instruction pointer is pushed onto the current stack and control is transferred to the SIDEIP mapped to the observed scenario. A fault may dispose of an instruction before that instruction is executed. A trap may dispose of an instruction after the instruction is executed.

In an embodiment, an architecturally defined blocking bit may be set to prevent recursive triggering of a yield event until the blocking bit is reset. A special return instruction may atomically reset the blocking bit and return control from the yield event handler back to the original code whose execution generated the yield event.

Based on the above description it will be appreciated that both the SXFR and SEMONITOR are "sequencer-aware" in that they include operands that identify particular sequencers. Further, the SSAVE and SRSTOR instructions, described later, are also "sequencer-aware" in that they include operands that identify particular sequencers. Also, these user-level instructions may be "sequencer-aware" in that they have a pointer to instructions in handler code. The handler code when executed by an instruction execution unit references one or more specific instruction sequencers when that handler code is executed. The handler code is associated with the user level instruction because the user level instruction directs the instruction pointer to the start of the handler code and the user level instruction directs the operations of the thread after the handler code is finished executing. Thus, the user level instructions may be sequencer aware if the user level instructions have either 1) a field that makes a specific reference to one or more instruction sequencers or 2) implicitly references with a pointer to handler code that specifically addresses one or more instruction sequencers when the handler code is executed.

In an embodiment, the instructions SXFR and SEMONITOR may be used to implement inter-sequencer control transfer as will be described, with reference to FIG. 5 of the drawings.

Figure 5:
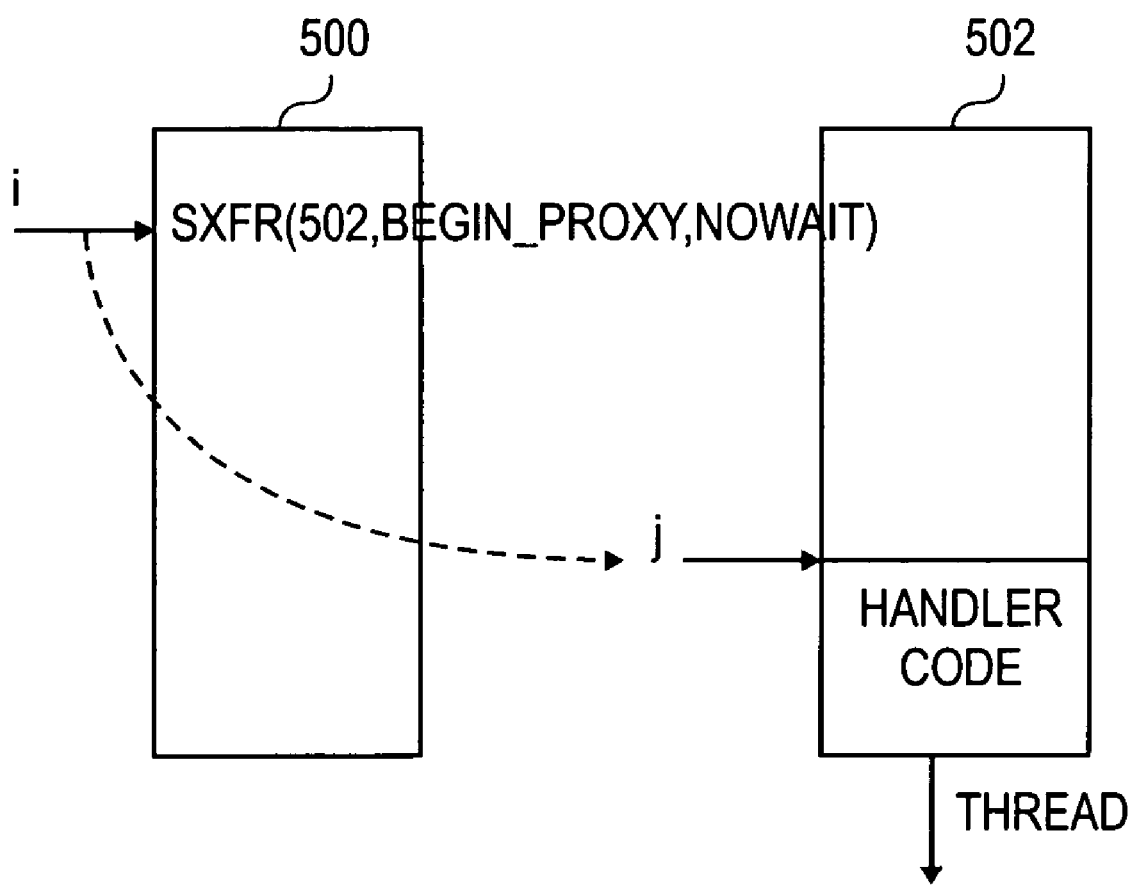
FIG. 5 illustrates how the SXFR instruction can be used to implement inter-sequencer control transfer, in accordance with one embodiment of the invention.

Referring to FIG. 5, a sequencer 500, upon encountering an SXFR instruction at an instruction pointer "I" transfers control to sequencer 502, to cause the sequencer 502 to start executing handler instructions starting at an instruction pointer "J". In an embodiment, a SXFR instruction in the format: SXFR (SID, SCENARIO_ID, CONDITIONAL_PARAMETER), for example, SXFR (502, BEGIN_PROXY, NOWAIT) may be used to affect the control transfer. Taking a closer look at the format of the SXFR instruction, the "SID" appearing in the instruction, is a reference to the sequencer identifier (SID) for the sequencer 502. The "SCENARIO_ID" part of the instruction is a reference to a scenario which, as described above, can be programmed into the system 100A, and 100B to cause asynchronous control transfer. As noted above, in an embodiment, the system 100A, and 100B supports the scenarios shown in the scenario table in FIG. 6A of the drawings. Each scenario is encoded to a scenario identifier (ID). In an embodiment, values corresponding to a particular scenario ID may be programmed into a register, from which it may be read when the SXFR instruction is executed.

In an embodiment, in order to resolve the instruction pointer associated with the "SCENARIO_ID" part of the SXFR instruction, the mapping table of FIG. 6B, which maps each scenario to a SIDEIP, is used.

As described above, in order to populate the table of FIG. 6B with the service channels, the SEMONITOR instruction is used. For example, the instruction SEMONITOR (1, (502,J)) which is of the format: SEMONITOR (SCENARIO_ID, SIDEIP), maps the instruction pointer "J" on sequencer 502 to the scenario indicated by SCENARIO_ID=1, i.e. the BEGIN_PROXY scenario. Execution of the instruction SXFR (502, 1), on the sequencer 500 causes a signal including a SCENARIO_ID of 1 to be delivered to the sequencer 502.

In response to the signal, the sequencer 502 incurs a yield event that causes a control transfer to the instruction pointer "J" at which with handler-code associated with the BEGIN_PROXY scenario begins. In an embodiment, instead of immediately executing the handler-code starting at the instruction pointer "J" in response to receiving the signal, the sequencer 502 may queue a number of received signals, and once the number of the signals exceeds a threshold, the sequencer 502 serving the signals by executing handler-code associated with the various signals. In an embodiment, the particular manner in which the sequencer 502 is to process a signal, i.e. whether by immediate processing, or by delayed processing using a queue, and the value of the threshold, is controlled or configured by the control parameter 406B in the SEMONITOR instruction. This queuing of requests can also be done in software as well.

In an embodiment, the handler-code may contain instructions to cause a service thread to start executing on the instruction sequencer 502. Basically, a service thread is any thread that aids or assists in the execution of a first thread executing on another sequencer, i.e. sequencer 500 in the case of FIG. 5. In order for the service thread to execute on the sequencer 502, there should be some form of state transfer between the sequencers 500 and 502. In an embodiment, a sequencer-specific context save instruction and a sequencer-specific context restore instruction is provided in addition to the SXFR and SEMONITOR instructions. The sequencer context save instruction is denoted as SSAVE and the sequencer context restore operation is denoted as SRSTOR. Both SSAVE and SRSTOR are sequencer-aware instructions. Alternatively, a minimal canonical instruction set may merely include the SXFR and SEMONITOR instructions. For example, in an embodiment, scenarios for sequencer context save and/or restore are defined. When the SXFR and SEMONITOR instructions are used in conjunction with a scenario and a pointer to handler code. The corresponding handler code on the target sequencer can perform the respective sequencer context save and/or restore operation, achieving the same effects of the dedicated SRSTOR and SSAVE instructions.

In another embodiment, a sequencer-aware context save instruction may be synthesized by having a scenario that maps to a code block to perform a sequencer-aware context save. Likewise, it is possible to synthesize a sequencer-aware context restore operation using a scenario.

In an embodiment, both the SSAVE and SRSTOR instructions include an operand corresponding to a SID, and operand comprising an address for a "save area" at which the state for the sequencer identified by the SID operand is to be saved. In the example of FIG. 5, in order for the sequencer 502 to be able to execute a service thread to facilitate or help execution of a first thread running on the sequencer 500, it is necessary for the sequencer 502 to have access to the execution context for the first thread. To make the execution context for the first thread available to the sequencer 502, the instruction SSAVE, is first executed on the sequencer 502 to save the execution context for the first thread executing on the sequencer 500 in a first memory location 512. In order to preserve the existing work done on sequencer 502 prior to performing service thread computation on behalf of sequencer 500, the currently running code (hereinafter "prior code") on 502 may perform SSAVE to save the execution context of the prior code to a second memory location 514. The save areas, the first memory location 512 and the second memory location 514 are not overlapping.

Once the execution context of the prior code is saved in the second memory location 514, the sequencer 502 executes a SRSTOR instruction indicating the first memory location 512 to change the sequencer states of the sequencer 502 to the execution context/state associated with the processing of the first thread on the sequencer 500. Thereafter, the sequencer 502 may commence execution of the service thread. While the service thread is executing, the options for the sequencer 500 include waiting for the service thread to complete execution, or to switching to execute a second thread. Once the service thread completes execution on the sequencer 502, the sequencer 502 executes a SXFR instruction to send a signal to sequencer 500 to indicate that the execution of the service thread has completed. Prior to sending the signal to the sequencer 500 to indicate that execution of the service thread has completed, the sequencer 502 executes a SSAVE instruction to save an updated execution context for the first thread after completion of the service thread in a third memory location 516.

In the case where sequencer 500 is waiting for service thread to complete execution, the service thread on sequencer 502 can then perform SRSTOR indicating the third memory location 516 to update the execution context for the first thread on sequencer 500, prior to executing SXFR to notify sequencer 500 to resume code execution.

Alternatively, upon receipt of the signal to indicate completion of the service thread from the sequencer 502, the sequencer 500 executes a SRSTOR (500, POINTER_TO_SAVE_AREA_B) instruction to change the execution context of the sequencer 500 to that of the first thread upon completion of the service thread.

In an embodiment, the saving and restoring of an instruction sequencer's context state can be performed remotely on a target sequencer. The source sequencer sends a message for the target instruction sequencer to save and/or restore its sequencer's context state. This could be implemented as a SXFR instruction with a particular scenario.

Figure 7:
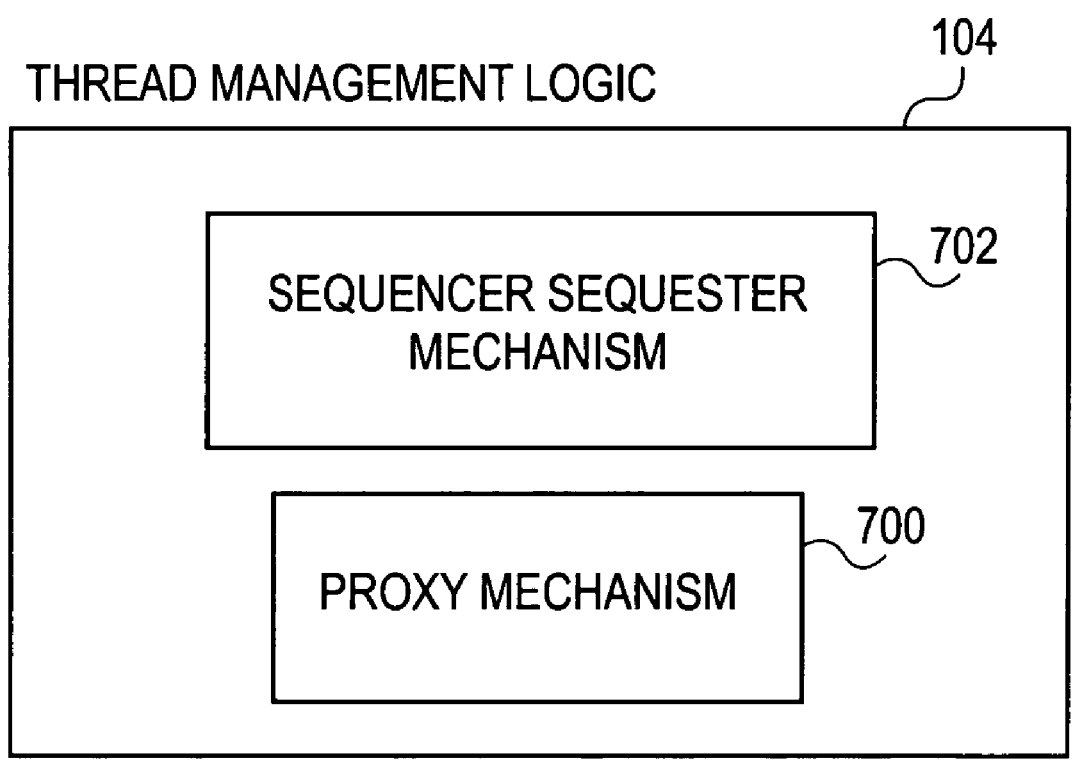
FIG. 7 shows a functional block diagram of the components that make up the thread management logic of the systems of FIGS. 1A and 1B, in accordance with one embodiment of the invention.

In an embodiment, the thread management logic 114 includes a proxy execution mechanism 700, and a sequencer sequester mechanism 702 as can be seen in FIG. 7 of the drawings.

Figure 8:
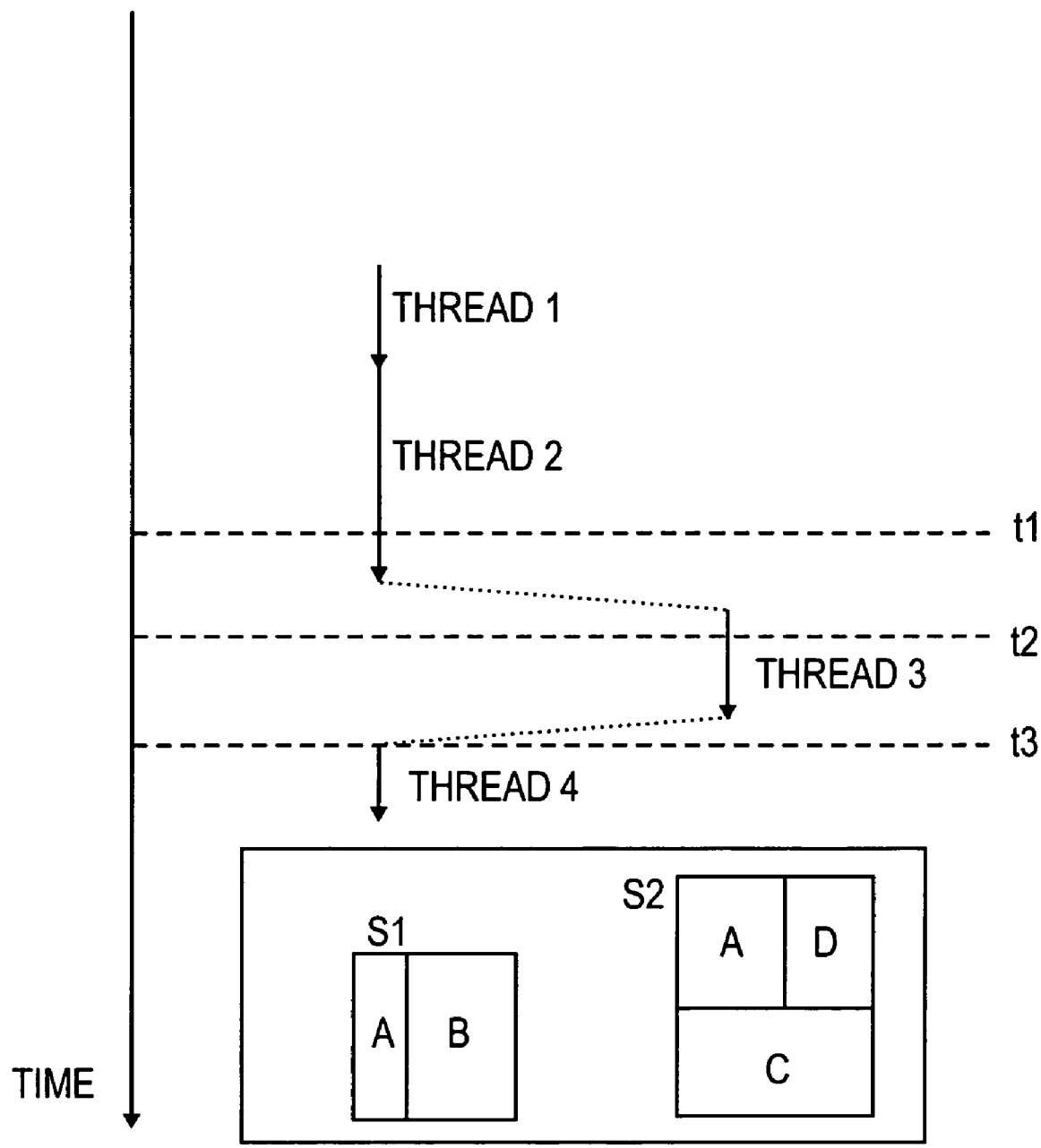
FIG. 8 illustrate the operation of a proxy execution mechanism, in accordance with one embodiment of the invention.

To illustrate the operation of the proxy execution mechanism 700, consider the system 800 shown in FIG. 8 of the drawings, which includes two sequencers designated S1, and S2 respectively. The sequencers S1, and S2 may be symmetrical or asymmetrical with respect to each other. In this example the sequencers are asymmetrical, with the sequencer S1 including only processing resources A and B, whereas the sequencer S2 includes processing resources A, D, and C. The processing resources of the sequencer S1 must be able to support the execution of the instruction blocks 1 and 2.

Time (T1) is located at the end arrow of the block of instructions 2. T1 shows the monitor detects an event that causes the migration of the single thread from the client instruction sequencer S1 to the servant instruction sequencer S2. At time T1, a third block of instructions is scheduled to execute on the sequencer S1, however the third block of instructions requires the use of a processing resource not available on the sequencer S1, say, the processing resource D, which is available on the sequencer S2. At this point, the sequencer S1, at least in an embodiment incurs a resource-not-available fault and a resource-not-available handler which may be defined in user-level software (or in thread management logic hardware or firmware) invokes the proxy execution mechanism 700 to cause the third block of instructions to be migrated to the sequencer S2 for execution thereon.

Time (T2) is located at the beginning of the line to the arrow of the third block of instructions. T2 shows the start of the execution of a block of instructions from the single thread on the servant instruction sequencer S2 on behalf of the client instruction sequencer S1.

Time (T3) is located at the end arrow of the third block of instructions. T3 shows the completion of the execution of a block of instructions from the single thread on the servant instruction sequencer S2. At time t3, after execution of the third block of instructions on the sequencer S2 using the processing resource D, the sequencer S2 uses the proxy execution mechanism 700 to signal to the sequencer S1 that execution of the third block of instructions has completed.

Time (T4) is located at the beginning of the line to the arrow of a fourth block of instructions. T4 shows the completion of the proxy execution of a block of instructions from the single thread on the servant instruction sequencer S2 and the transfer back to the client instruction sequencer S1. The sequencer S1 can then proceed to execute, a fourth block of instructions, which merely requires processing resources available on the sequencer S1.

Since, in above example, the sequencer S1 is using the sequencer S2 to execute an instruction block on its behalf, the sequencer S1 is called a "client" sequencer. The sequencer S2, which operates in a proxy execution mode to execute an instruction block on behalf a client sequencer, is known as a "servant" sequencer. The resource D may comprise a highly specialized functional unit for a limited set of applications. The functional unit may be relatively power hungry, costly, and complex. Thus, in order to save costs, in a particular implementation the resource D is only implemented on the sequencer S2, and not on the sequencer S1. However, as noted above, the proxy execution mechanism 700 masks the asymmetry between the sequencers in a multi-sequencer system by mapping the processing resources available on the various sequencers in a multi-sequencer system so that a client sequencer can use the proxy execution mechanism to migrate a thread to execute on a sequencer that has a processing resource required, or optimized to execute the thread. The proxy execution mechanism 700, may also be used to migrate an instruction block executing on a OS-sequestered sequencer, to an OS-visible sequencer, e.g. in order to perform an OS service, such as the handling of a page fault or a syscall, as will be explained in greater detail below with reference to FIG. 11 of the drawings.

For a given physical implementation of the multi-sequencer system with asymmetric resource organization, the proxy execution mechanism 700 may be constructed using the SEMONITOR and SXFR instructions, as described above, and include a mapping mechanism. In general, the proxy execution mechanism 700 may reside in hardware, in firmware (e.g. microcode), or at a system software layer, or application software layer. In an embodiment, the proxy execution mechanism 700 may use the SEMONITOR and SXFR instructions to handle two categories of proxy services. The first category is known as an egress service scenario, whereas the second category is known as the ingress service scenario. On a client sequencer, for a set of resources and the associated operations that are not available or physically not supported in the client sequencer, egress service scenarios are defined to trap or fault these operations. Each egress scenario is mapped to a sequencer ID (and instruction pointer (SIDEIP)) pointing to a servant sequencer. The mapping may be achieved in hardware, firmware or even in software. The proxy access of the servant sequencer can then be achieved using inter-sequencer signaling, as described above.

A servant sequencer is responsible for supporting proxy access to the resources that are not present in a client sequencer but present on the servant sequencer. The ingress service scenarios are defined and configured into the service channel and mapped to the local service handlers (handler-code) that perform the proxy execution on behalf of the client sequencers. A list of sample egress and ingress service scenarios is provided in the table of FIG. 6A.

In one sense, an egress service scenario corresponds to a trap or fault operation that incurs a "miss" at a client sequencer due to required access to a processing resource not available on the client sequencer yet available on a servant sequencer. Conversely, an ingress service scenario corresponds to asynchronous interrupt condition indicating the arrival of a request to access a local processing resource, available on the servant sequencer, on behalf of a client sequencer that does not possess the local processing resource. The proxy execution mechanism defines a veneer or layer of abstraction associated with each sequencer in a multi-sequencer so that the client and servant sequencers work in concert to perform proxy resource access. In at least one embodiment where the proxy execution is implemented in firmware or directly in hardware, the proxy resource access is transparent to user-level software and to an OS.

Each service scenario plays a similar role to that of an opcode in a traditional ISA, except that a service scenario triggers a special handler-code flow. Thus, it is possible to synthesize new composite instructions using the SXFR instruction as meta-instruction and an egress service scenario mapped to handler-code for the instruction being synthesized. In an embodiment, the relationship between a service scenario ID, and its handler-code flow is akin to the relationship between a Complex Instruction Set Computer (CISC) opcode and its corresponding microcode flow. The CISC can be composed by using the user-level sequencer aware monitor and control transfer instructions as the canonical instruction basis to build the microcode flow. As described above, the mapping between a service scenario and its handler-code is achieved via SEMONITOR, while SXFR provides a mechanism for sending control messages between sequencers. The communication of the control messages act as a trigger for the execution of handler-code mapped to the service scenarios.

Figure 9:
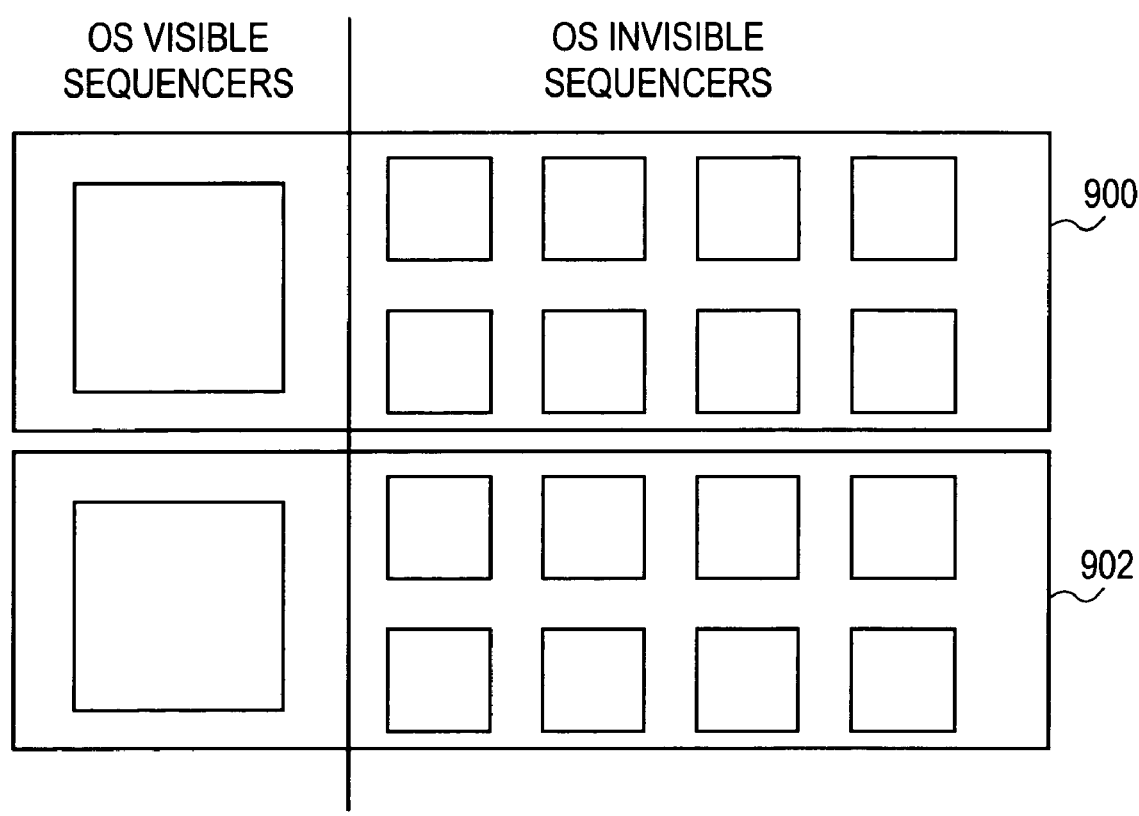
FIGS. 9 and 10 show examples of logical processors, in accordance with one embodiment of the invention.

In an embodiment, the sequencer sequester mechanism 702 may be used to map or group a particular combination of OS-visible sequencers and OS-sequestered sequencers to form a logical processor. The mapping may be a one-to-many mapping comprising a single OS-visible sequencer mapped to many OS-sequestered sequencers, or a many-to-many mapping comprising many OS-visible sequencers mapped to many OS-sequestered sequencers. For example, FIG. 9 shows a multi-sequencer system comprising two logical processors 900 and 902, respectively. Each of the logical processors 900 and 902 comprise a one-to-many mapping in which a single OS-visible sequencer is mapped to many OS-sequestered sequencers.

Figure 10:
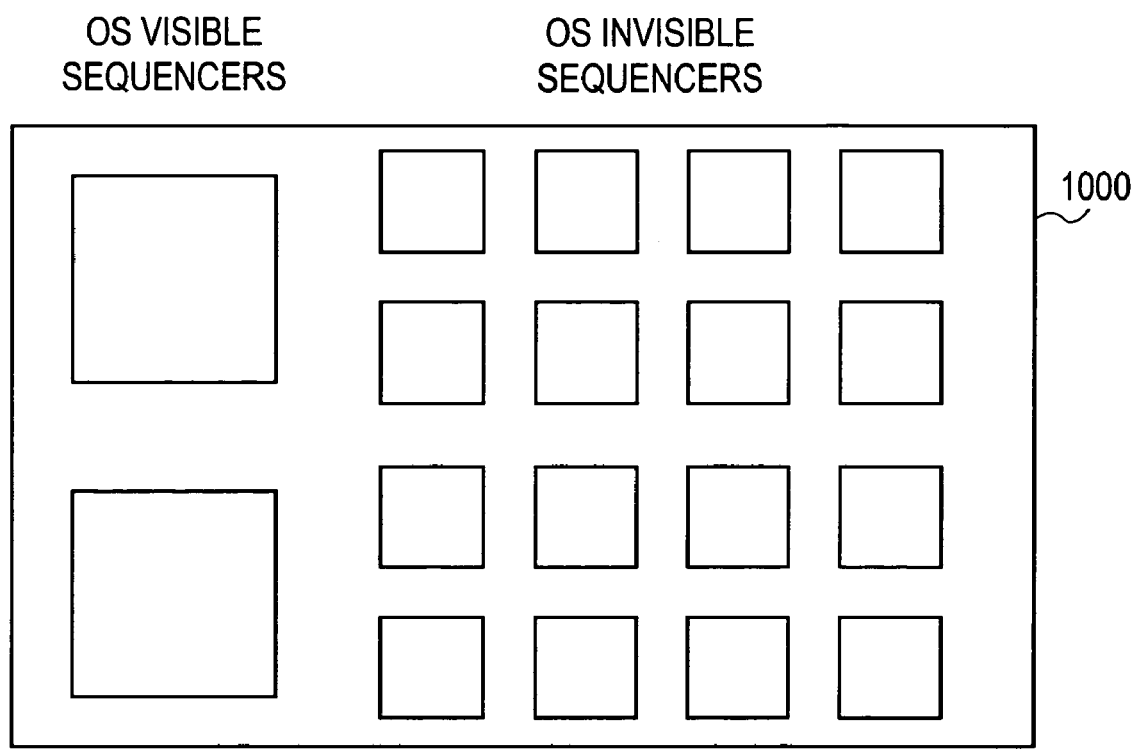

Turning to FIG. 10, an example multi-sequencer system 1000 may include an ensemble of 18 sequencers in which two OS-visible sequencers are mapped to 16 OS-sequestered sequencers to define a many-to-many mapping. Within the logical processor of the system 1000, both of the OS-visible sequencers can serve as a proxy for any of the OS-sequestered sequencers.

In an embodiment, the sequencer sequester mechanism 702 may selectively sequester sequencers away from OS control. According to different embodiments of the invention, the sequencers may be sequestered post boot or in some cases even during boot time. In order to sequester a sequencer under OS control, the sequencer sequester mechanism 702 may set an indicator to the OS to specify that the sequencer is in an unavailable state. For example, the sequencer sequester mechanism 702 may impersonate a sequencer's power or power/performance state to indicate to the OS that the sequencer has entered a special unavailable state so that the OS will deem the sequencer as too overloaded or too hot to dispatch computation or schedule instructions for the sequencer. In an embodiment, for a sequencer that implements a power saving mechanism such as Intel SpeedStep© technology, the sequencer sequester mechanism 702 may turn a particular subset of OS-visible sequencers to the special power states to indicate that the subset of sequencers are in the non-available state so that the OS will deem these subset of sequencers as overloaded and thus not dispatch computation to the subset of sequencers. In a manner transparent to the OS, the SXFR and SEMONITOR instructions may be used to schedule computations or threads for the sequestered sequencer.

In an embodiment, once a sequestered sequencer has completed executing a thread, control of the sequestered sequencer may be surrendered back to the OS. This may be achieved by a mechanism setting an indicator to indicate to the OS that the sequestered instruction sequencer is no longer in the non-available state.

In an embodiment, a privileged state of a sequestered instruction sequencer is synchronized with a counterpart privileged state of non-sequestered instruction sequencers that are still under OS control.

In general, in order to canonically support a general purpose M:N multi-threading package, i.e. one that maps M threads to N sequencers, where M>>N, the minimal building block synchronization objects that are required are critical section and event. With these synchronization objects, higher level synchronization objects like mutexes, conditional variables, and semaphores can be constructed. A critical section can be implemented via hardware lock primitives. The sequestered sequencers can inherit state from the non-sequestered sequencers such that the view of virtual memory is the same for both sequestered sequencers and non-sequestered sequencers. An event can be supported by an event-driven multi-sequencer scheduler (centralized or distributed) synthesized with the SXFR and SEMONITOR instructions. For example, a simple POSIX compliant or compatible distributed scheduler that has a global task queue protected by a critical section may be created. Each sequencer effectively runs one copy of the scheduler and attempts to contend access to the head of the task queue to grab the next ready task thread to run on the sequencer. Should one task on a sequencer be waiting for a synchronization variable such as mutex, a conditional variable, or a semaphore, the task will be de-scheduled via yield and put at the tail of the global task queue after entering the corresponding critical section.

Due to the widespread adoption of thread primitives in most modern OSes' thread libraries, it is possible that a vast number of existing threaded code built on top of these POSIX compliant or compatible thread libraries can be ported to the multi-sequencer environment. Naturally, the header files in the threads may have to be remapped and the legacy threaded code recompiled.

By using the SFXR and SEMONITOR instructions and the INIT scenario, it is possible to schedule threads of execution on OS-sequestered sequencers, without using an OS. Thus, by virtue of the techniques disclosed herein it is possible to build a multi-sequencer system with more sequencers than an OS has the ability to support and to allow user-level scheduling of threads on sequencers of the multi-sequencer system that are not supported by the OS.

Accordingly, in an embodiment, the multiple instruction sequencers with the extended instruction set can also support a single image OS on larger number of processors than natively supported by the OS. For example, an OS capable of supporting a 4-way instruction sequencer could be implemented as the OS for a hardware implementation that actually has 32-way instruction sequencer system. This allows applications to use more processors than the number of sequencers limit supported by the OS. The instruction sequencers may be asymmetric sequencers or symmetric sequencers.

Figure 11:
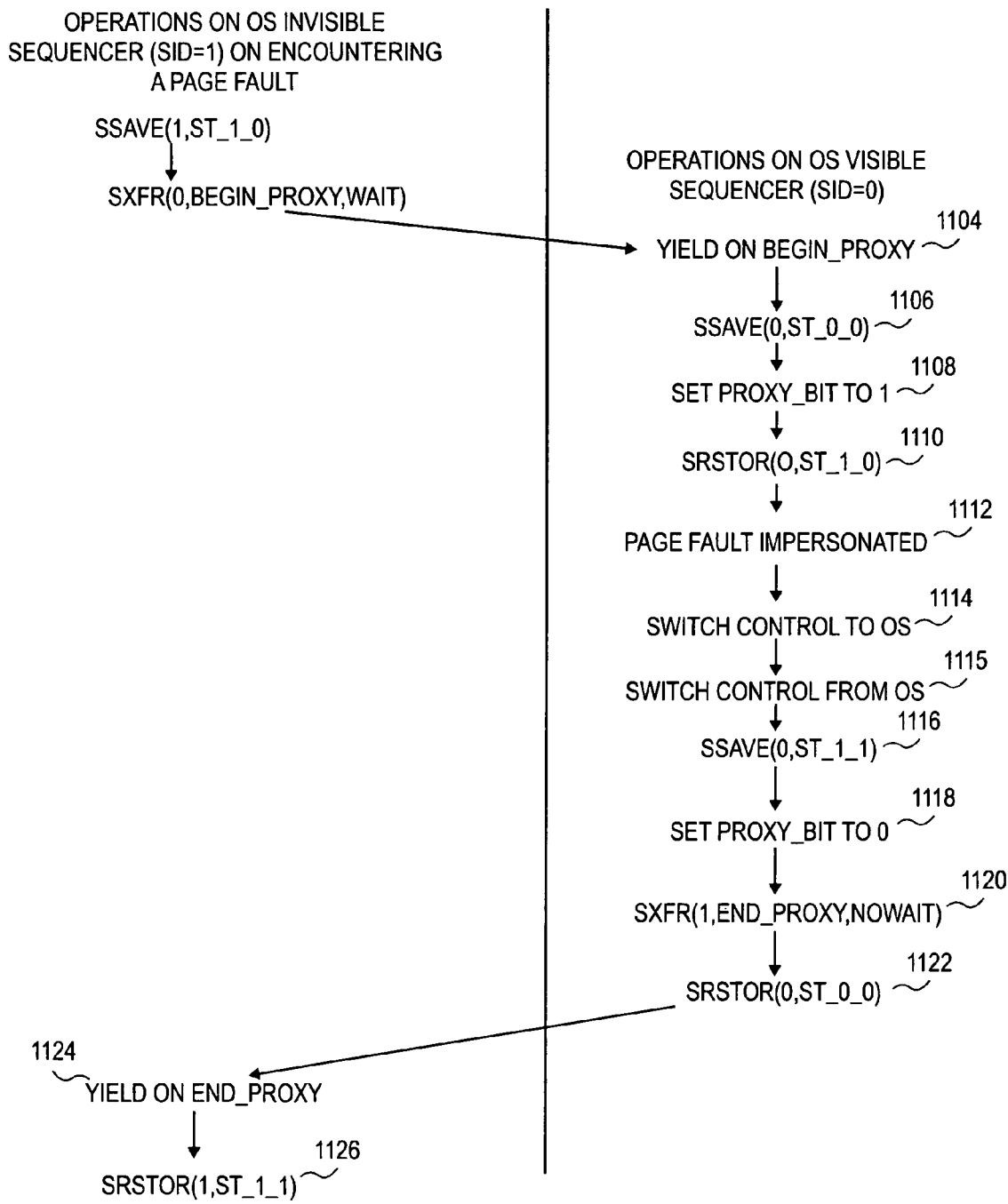
FIG. 11 shows how the SXFR and SEMONITOR instructions may be used to make an OS call, in accordance with one embodiment of the invention.

Now we describe one embodiment for proxy execution in a multisequencer system where some sequencers are OS-visible while others are OS-invisible. In general, when code running on the OS-invisible sequencers incurs a page fault or a system call that requires OS services, proxy execution mechanism ensures proper handling. Referring now to FIG. 11 of the drawings, there is shown a flowchart of operations performed in order to affect an OS service on an OS-sequestered sequencer with sequencer ID SID1, in response to a trigger event for proxy execution. Upon encountering the trigger event, the OS-sequestered sequencer SID1 executes the instruction SSAVE (1, ST_1_0), at 1100. The trigger event may be a predefined condition of execution in the architectural state requiring an OS service, such as a trap, a page fault, or a system call. This instruction saves the execution context of a thread whose execution generated the trigger event. For descriptive convenience, the save area for the execution context of the thread is designated (ST_1_0), to which access will not cause page fault in at least one embodiment. At 1102, a SXFR instruction is executed in order to pass the egress service scenario "BEGIN_PROXY" to an OS-visible sequencer SID0. Note that because the SXFR instruction executed at 1102 included the conditional parameter "WAIT", processing of instructions on sequencer SID1 is to be blocked pending completion of the proxy execution thread on the sequencer SID0. At 1104, the sequencer SID0 detects the signal from the sequencer SID1, and yields or "temporarily suspends", execution of the current thread. At 1106, a SSAVE instruction is executed to save the execution context or state associated with sequencer SID0. The execution context save area is labeled "ST_0_0" which does not overlap with ST_1_0. At 1108, a proxy bit is set to 1 to indicate that the sequencer SID0 is operating in proxy execution mode. At 1110, a context restore operation (SRSTOR) is executed in order to copy the state "ST_1_0", which is the execution context associated with the page fault on SID1. At 1112, the page fault is replicated or impersonated on the sequencer SID0. At 1114, a ring transition is performed to switch control to the OS. The OS services the page fault. When OS service completes, upon the privilege level switch (i.e. a ring transition) from OS to user-level and if the proxy-bit is ON, the END_PROXY scenario is incurred as an intra-sequencer yield event. In the yield event handler due to END_PROXY scenario, at 1116, a context save is performed to save an execution context "ST_1_1". At 1118, the proxy bit is set to 0. At 1120, a SXFR instruction is executed to pass the service scenario "END_PROXY" to the sequencer SID1. At 1122, the sequencer SID0 restores state ST_0_0. At 1124, the sequencer SID1 yields on receiving the "END_PROXY" scenario to restore, at 1126, the context "ST_1_1" so that execution of the thread that encountered the trigger event may recommence.

In an embodiment, proxy execution may be the migration of a user level thread in response to detecting an asymmetric condition between an OS-visible instruction sequencer and an instruction sequencer under the control of an application level program when executing the user level thread.

An asymmetric condition between the instruction sequencers may include at least the following conditions such as the need for a ring/privilege level transition; which includes a page fault or system call, a lack of instruction capability by the instruction sequencer executing the user level thread (e.g., deprecation of certain instruction on one sequencer and resulting invalid op code fault), a difference in instruction execution performance between the two instruction sequencers.

States migration during proxy execution may be heavy weight or light weight. Heavy weight migration is a full register state that is saved from a transferring sequencer and restored onto the receiving sequencer. Heavy weight migration has at least one instruction from the user level thread executed on the receiving sequencer for the benefit of the transferring sequencer. Heavy weight migration allows for user level thread being executed to stay at the receiving sequencer or to return to the transferring sequencer after executing one or more instruction on behalf of the transferring instruction sequencer.

Light weight migration has many varieties—the idea being to streamline for specific situations. Light weight migration may include transferring some small amount of state so that some small task may be handled. In some light weight migration scenarios, an instruction from the user level thread is not actually executed—e.g., in the page fault situation. The instruction sequencer under the control of an application level program just transfers over the address that causes the page fault. The receiving sequencer just performs a probe load to cause the page to be loaded, and then conveys that this desired task has been accomplished back to the instruction sequencer under the control of the application level program. Thus, migration may not mean that an instruction from the migrating user level thread is actually executed.

Thus a proxy execution occurs essentially, anytime a second instruction sequencer performs an action 'on behalf of' or 'derived from' a first instruction sequencer that is executing a user level thread.

In an embodiment for the light-weight handling of page fault, one aspect of proxy execution includes the suspension of execution of instructions in a user-level thread in a first instruction sequencer that is under the control of the application level program. The transferring an address pointer from the first instruction sequencer that is under the control of the application level program to an OS-visible instruction sequencer. The loading of the contents at the address pointer with the OS-visible instruction sequencer. Finally, the resuming of execution of the first user-level thread in the instruction sequencer that is under the control of the application level program after the contents at the address pointer have been loaded.

Another aspect of proxy execution includes the transferring of control and state information from an OS sequestered instruction sequencer to an OS-visible instruction sequencer. Also, the migrating of execution of at least one instruction from the first user-level thread on the OS sequestered instruction sequencer to the OS-visible instruction sequencer so that the OS-visible instruction sequencer may trigger an operating system to perform an OS operation on behalf of the OS sequestered instruction sequencer.

Figure 12:
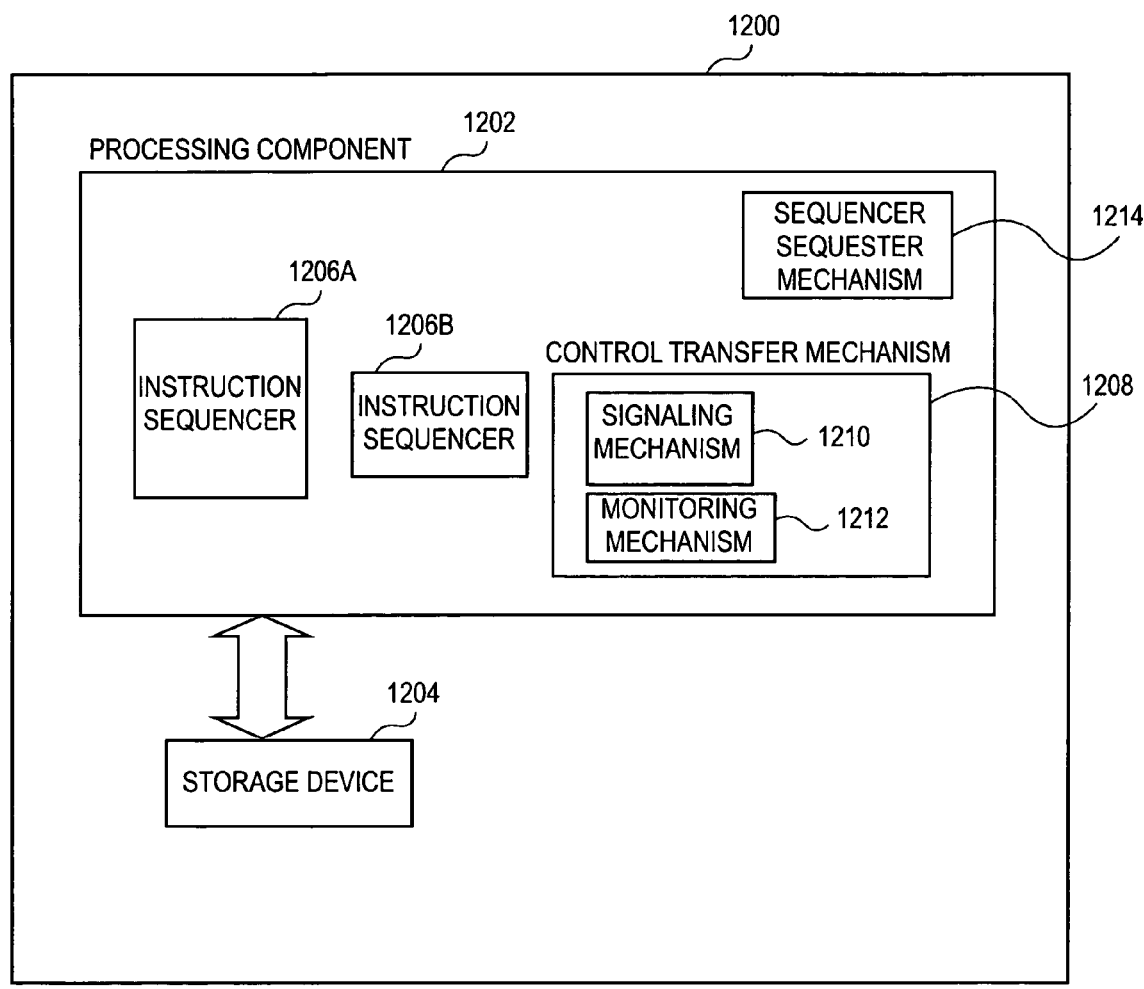
FIG. 12 shows a processing system in accordance with one embodiment of the invention.

FIG. 12 of the drawings shows a processing system 1200, in accordance with one embodiment of the invention. As will be seen, the system 1200 includes a processing component 1202 that is coupled to a storage device 1204. In an embodiment, the processing component 1202 includes a plurality of instruction sequencers, only two of which have been shown in FIG. 12 of the drawings where they are designation as 1206A, and 1206B, respectively. The processing component 1202 also includes a control transfer mechanism 1208 that includes a signaling mechanism 1210, and a monitoring mechanism 1212. The signaling mechanism 1210 may be used to send scenarios/control-transfer messages between the sequencers of the processing component 1202. As such, in an embodiment, the signaling mechanism 1210 includes logic to execute the SXFR instruction described above. The monitoring mechanism 1212 may be used to set up any of the instruction sequencers of the processing component 1202 to monitor for a signal that includes a particular control message/scenario. In an embodiment, the monitoring mechanism includes logic to decode the SEMONITOR instruction described above.

The processing component 1202 also includes a sequencer sequester mechanism 1214, as described above.

The storage device 1204 may include an operating system. In an embodiment, the operating system may perform context switching by storing a previous task's entire register state and restoring the next task's entire register state.

Within the processing component 1202, various techniques may be used to set up, for example, the sequencer 1206B to monitor for particular signals from the sequencer 1206A. In an embodiment, the sequencer 1206B may be pre-configured (i.e., without requiring any user configuration step) to monitor for signals that carry certain control messages/scenarios. Thus, in an embodiment, the sequencer 1206B may be pre-configured to monitor for a signal that carries the INIT scenario. It will appreciated, that a user-level instruction such as SXFR may be used to trigger execution of initialization code on the sequencer 1206B. The initialization code itself may comprise a SEMONITOR instruction that may be used set up the sequencer 1206B to monitor for particular signals (scenarios) from the sequencer 1206A.

In another embodiment, the sequencer-aware SEMONITOR instruction may be executed on the sequencer 1206A to cause the sequencer 1206B to monitor for particular signals/scenarios from the sequencer 1206A. In another embodiment, a pointer to a memory location that store bootstrap/initialization code may be saved as part of a context for the sequencer 1206A using the SSAVE instruction described above. For this embodiment, it is possible to execute a SRSTOR instruction on the sequencer 1206B to restore the context/state for the sequencer 1206A so that the bootstrap/initialization code may be executed. The bootstrap/initialization code by itself contains at least one SEMONITOR instruction to set up the sequencer 1206B to monitor for particular signals/scenarios from the sequencer 1206A.

During development, a design may go through various stages, from creation to simulation to fabrication. Data representing a design may represent the design in a number of manners. First, as is useful in simulations, the hardware may be represented using a hardware description language or functional description language. Additionally, a circuit-level model with logic/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine-readable medium. Any optical or electrical wave modulated or otherwise generated to transform such information, a memory, or a magnetic or optical storage such as a disc may be the machine-readable medium. Any of these mediums may "carry" or "indicate" the design or software information. When an electrical carrier wave indicating or carrying the code or design is transmitted, to the extent that copying, buffering or retransmission of the electrical signal is performed, a new copy is made. Thus, a communication provider or a network provider may make copies of an article (carrier wave) embodying techniques of the present invention.

While certain exemplary embodiments have been described and shown in the accompanying drawings, it is to be understood that such embodiments are merely illustrative and not restrictive of the broad invention and that this invention is not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principals of the present disclosure or the scope of the accompanying claims.

What is claimed is:
1. A processor comprising:
a hardware event counter to count a number of performance-limiting events resulting from the execution of one or more user-level threads of a user-level multi-threaded program, wherein the one or more user-level threads are to be modified as they are being issued;
an operating system (OS) invisible sequencer to execute a first instruction, in response to occurrence of a trigger event, to cause saving of an execution context of a thread whose execution generated the trigger event; and an OS visible sequencer to execute a proxy thread, in response to a second instruction, wherein upon completion of the proxy thread, execution of the thread whose execution generated the trigger event is to be resumed based on the saved execution context.

2. The processor of claim 1 wherein the number of performance-limiting events include at least one transition from a first resource privilege level to a second resource privilege level.

3. The processor of claim 2 wherein the at least one transition is to result from an exception produced as a result of executing at least one user-level thread.

4. The processor of claim 2 wherein the at least one transition is to result from an interrupt produced as a result of executing at least one user-level thread.

5. The processor of claim 1 wherein the number of performance-limiting events includes a page fault.

6. The processor of claim 1 wherein the number of performance-limiting events includes a system call.

7. The processor of claim 1 further comprising a proxy execution notification circuit to notify a user-level program of an occurrence of a proxy execution event produced as a result of a page fault.

8. The processor of claim 7 wherein the proxy execution notification circuit is to notify a user-level program of an occurrence of a proxy execution event produced as a result of a system call.

9. The processor of claim 1, wherein one or more operating system (OS)-visible sequencers, corresponding to the one or more user-level threads, are to be set to one or more power states to indicate whether the one or more OS-visible sequencers are in non-available states so that the OS will not dispatch computation to the one or more OS-visible sequencers.

10. The processor of claim 1, wherein the trigger event corresponds to a predefined condition of execution in an architectural state requiring an OS service comprising a trap, a page fault, or a system call.

11. A system comprising:
a memory to store a user-level program and a scheduler to schedule user-level threads generated by the user-level program;
a processor to provide performance information to the user-level program about one or more of the user-level threads when performed by the processor, wherein the one or more user-level threads are to be modified as they are being issued;
an operating system (OS) invisible sequencer to execute a first instruction, in response to occurrence of a trigger event, to cause saving of an execution context of a thread whose execution generated the trigger event; and
an OS visible sequencer to execute a proxy thread, in response to a second instruction, wherein upon completion of the proxy thread, execution of the thread whose execution generated the trigger event is to be resumed based on the saved execution context.

12. The system of claim 11 wherein the memory is to further store at least one software-based counter to count performance-limiting events within the processor as a result of executing the one or more user-level threads.

13. The system of claim 12 wherein the at least one software-based counter includes a counter to count the number of times a call is made to at least one of a plurality of thread locking primitives.

14. The system of 13 wherein the at least one software-based counter includes a counter to count the number of times a call made to at least one of the plurality of thread locking primitives is blocked.

15. The system of claim 14 wherein at least one of the plurality of thread locking primitives is chosen from a group consisting of: a spin lock and a block lock.

16. The system of claim 15 wherein the spin lock corresponds to a critical section of the user-level program and the block lock corresponds to a portion of the user-level program in which a mutex or a semaphore is to be used to synchronize between one or more user-level threads.

17. The system of 12 wherein the at least one software-based counter includes a run-time counter to count an amount of time a sequencer within the processor is operating on at least one of the user-level threads.

18. The system of claim 12 wherein the at least one software-based counter includes an idle-time counter to count an amount of time a sequencer within the processor is not operating on at least one of the user-level threads.

19. The system of claim 12 wherein one or more of the performance-limiting events may be monitored by the user-level program on a per-instruction basis so as to allow the user-level program to reduce the number of performance-limiting events.

20. A method comprising:
scheduling one or more user-level threads;
executing the one or more user-level threads; monitoring performance information related to the one or more user-level threads;
modifying a user-level program in response to monitoring the performance information in order to reduce a number of performance-limiting events resulting from executing the one or more user-level threads,
wherein the one or more user-level threads are to be modified as they are being issued and wherein an operating system (OS) invisible sequencer is to execute a first instruction, in response to occurrence of a trigger event, to cause saving of an execution context of a thread whose execution generated the trigger event and an OS visible sequencer is to execute a proxy thread, in response to a second instruction, wherein upon completion of the proxy thread, execution of the thread whose execution generated the trigger event is to be resumed based on the saved execution context.

21. The method of claim 20 wherein monitoring comprises identifying a first instruction pointer that corresponds to a most number of page faults occurring as a result of executing the one or more user-level threads.

22. The method of claim 21 wherein modifying comprises moving at least one instruction corresponding to the first instruction pointer outside of a parallel portion of the user-level program to a serial section of the user-level program.

23. The method of claim 22 wherein modifying further comprises marking the serial section of code to execute as a run-ahead user-level thread.

24. The method of claim 20 wherein monitoring comprises identifying a second instruction pointer corresponding to a most-frequently called system call within the user-level program.

25. The method of claim 24 wherein modifying comprises moving at least one instruction corresponding to the second instruction pointer to a serial portion of the user-level program if the at least one instruction appears within a parallel section of the user-level program.

26. The method of claim 25 wherein modifying further comprises marking the serial portion of code to execute as a run-ahead user-level thread.

27. The method of claim 20 wherein modifying comprises:
replacing spin locks within the user-level program with blocking locks; and
setting the affinity of at least two dependent user-level threads blocked by a mutex primitive to the same or different processing resources.

28. The method of claim 27 wherein modifying comprises setting the affinity of at least two dependent user-level threads blocked by a mutex primitive to different or the same processing resources.

29. A storage device having stored thereon a set of instructions, which if executed by a machine cause the machine to perform a method comprising:
scheduling one or more user-level threads;
issuing the one or more user-level threads to a processor;
monitoring performance information related to the one or more user-level threads;
modifying the one or more user-level threads in response to monitoring the performance information in order to reduce a number of performance-limiting events resulting from performing the one or more user-level threads, wherein the one or more user-level threads are to be modified as they are being issued and wherein an operating system (OS) invisible sequencer is to execute a first instruction, in response to occurrence of a trigger event, to cause saving of an execution context of a thread whose execution generated the trigger event and an OS visible sequencer is to execute a proxy thread, in response to a second instruction, wherein upon completion of the proxy thread, execution of the thread whose execution generated the trigger event is to be resumed based on the saved execution context.

30. The storage device of claim 29 wherein modifying comprises transferring a first user-level thread to an operating system (OS)-visible sequencer from an OS-invisible sequencer if the first user-level thread incurs more than a first number of proxy executions.

31. The storage device of claim 30 wherein modifying comprises adjusting an affinity of a second user-level thread such that user-level threads dependent upon the second user-level thread run on the same sequencer if the second user-level thread incurs more than a first amount of time blocked by a synchronization primitive.

32. The storage device of claim 29 wherein the one or more user-level threads are to be modified only before they are compiled by a compiler.

* * * * *